(12) United States Patent
Harris et al.

(10) Patent No.: US 9,307,353 B2
(45) Date of Patent: Apr. 5, 2016

(54) SYSTEM AND METHOD FOR DIFFERENTIALLY PROCESSING A LOCATION INPUT FOR CONTENT PROVIDERS THAT USE DIFFERENT LOCATION INPUT FORMATS

(71) Applicant: Geofeedr, Inc., Naples, FL (US)

(72) Inventors: Philip B. Harris, Naples, FL (US); Scott K. Mitchell, Naples, FL (US); Michael J. Mulroy, Glencoe, IL (US)

(73) Assignee: Geofeedia, Inc., Naples, FL (US)

( * ) Notice: Subject to any disclaimer, the term of this patent is extended or adjusted under 35 U.S.C. 154(b) by 0 days.

(21) Appl. No.: 13/788,843

(22) Filed: Mar. 7, 2013

(65) Prior Publication Data

US 2014/0256355 A1    Sep. 11, 2014

(51) Int. Cl.
| | | |
|---|---|---|
| G06F 17/30 | (2006.01) | |
| H04W 4/02 | (2009.01) | |
| H04W 4/18 | (2009.01) | |
| H04W 4/20 | (2009.01) | |

(52) U.S. Cl.
CPC ............... *H04W 4/02* (2013.01); *H04W 4/021* (2013.01); *H04W 4/18* (2013.01); *H04W 4/206* (2013.01)

(58) Field of Classification Search
CPC ..................................................... H04W 4/02
See application file for complete search history.

(56) References Cited

U.S. PATENT DOCUMENTS

| | | | | |
|---|---|---|---|---|
| 6,363,320 B1 * | 3/2002 | Chou | ........................... | 701/446 |
| 6,591,266 B1 | 7/2003 | Li | | |
| 7,522,940 B2 | 4/2009 | Jendbro et al. | ................ | 455/566 |
| 7,680,796 B2 | 3/2010 | Yeh | | |
| 7,698,336 B2 | 4/2010 | Nath | ............................. | 707/737 |
| 7,912,451 B2 | 3/2011 | Eckhart | ........................ | 455/410 |

(Continued)

FOREIGN PATENT DOCUMENTS

| | | |
|---|---|---|
| EP | 1 045 345 | 10/2000 |
| WO | WO 99/15995 | 4/1999 |

(Continued)

OTHER PUBLICATIONS

U.S. Appl. No. 13/284,455, a non-final Office Action, mailed Jan. 7, 2013, 18 pages.

(Continued)

*Primary Examiner* — Aleksandr Kerzhner
*Assistant Examiner* — Michael K Tamaru
(74) *Attorney, Agent, or Firm* — Sheppard Mullin Richter & Hampton LLP

(57) ABSTRACT

The disclosure relates to systems and methods for processing a location input that specifies one or more geographically definable locations for input to individual ones of a plurality of social media or other content providers that have different input formats for specifying locations. A geo-location input may be normalized to an input format that conforms to a particular content provider, which may use a format for the geo-location input that is different that a format used by another content provider. The formatted geo-location input may be communicated to the particular content provider to obtain content from the content provider. The formatting may result in artifacts such as over-inclusive results having excess content and/or under-inclusive results that omit content that should have been provided. The obtained content obtained may corrected based on a determination of whether the content is over-inclusive and/or under-inclusive by removing obtained content and/or adding new content.

21 Claims, 11 Drawing Sheets

(56) References Cited

U.S. PATENT DOCUMENTS

| | | | |
|---|---|---|---|
| 7,974,983 B2 | 7/2011 | Goeldi | |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 8,484,224 B1 | 7/2013 | Harris et al. | 707/748 |
| 8,595,317 B1 | 11/2013 | Harris et al. | 709/213 |
| 8,612,533 B1 | 12/2013 | Harris et al. | 709/206 |
| 8,639,767 B1 | 1/2014 | Harris et al. | 709/207 |
| 8,655,873 B2 | 2/2014 | Mitchell et al. | 707/724 |
| 8,655,983 B1 | 2/2014 | Harris et al. | 709/217 |
| 8,843,515 B2 | 9/2014 | Burris | |
| 8,849,935 B1 | 9/2014 | Harris | |
| 8,850,531 B1 | 9/2014 | Harris | |
| 8,862,589 B2 | 10/2014 | Harris | |
| 8,990,346 B2 | 3/2015 | Harris | |
| 9,055,074 B2 | 6/2015 | Harris | |
| 9,077,675 B2 | 7/2015 | Harris | |
| 9,077,782 B2 | 7/2015 | Harris | |
| 9,258,373 B2 | 2/2016 | Harris | |
| 2002/0029226 A1 | 3/2002 | Li et al. | 707/104.1 |
| 2002/0116505 A1 | 8/2002 | Higgins | |
| 2002/0188669 A1 | 12/2002 | Levine | |
| 2003/0040971 A1 | 2/2003 | Freedenberg | |
| 2003/0088609 A1 | 5/2003 | Guedalia et al. | 709/107 |
| 2004/0203854 A1 | 10/2004 | Nowak | 455/456.1 |
| 2004/0225635 A1 | 11/2004 | Toyama et al. | 707/1 |
| 2005/0034074 A1 | 2/2005 | Munson et al. | 715/712 |
| 2006/0002317 A1 | 1/2006 | Punaganti Venkata | 370/310 |
| 2006/0184968 A1 | 8/2006 | Clayton et al. | 725/56 |
| 2006/0200305 A1 | 9/2006 | Sheha et al. | 701/200 |
| 2007/0043721 A1* | 2/2007 | Ghemawat et al. | 707/ |
| 2007/0112729 A1 | 5/2007 | Wiseman et al. | 707/3 |
| 2007/0121843 A1 | 5/2007 | Atazky et al. | 379/114.13 |
| 2007/0143345 A1 | 6/2007 | Jones et al. | 707/104.1 |
| 2007/0210937 A1 | 9/2007 | Smith et al. | 340/995.1 |
| 2007/0276919 A1 | 11/2007 | Buchmann et al. | 709/217 |
| 2007/0294299 A1 | 12/2007 | Goldstein | |
| 2008/0092054 A1 | 4/2008 | Bhumkar et al. | 715/739 |
| 2008/0104019 A1 | 5/2008 | Nath | 707/3 |
| 2008/0125969 A1 | 5/2008 | Chen | |
| 2008/0162540 A1* | 7/2008 | Parikh et al. | 707/102 |
| 2008/0192934 A1 | 8/2008 | Nelger et al. | 380/258 |
| 2008/0250031 A1 | 10/2008 | Ting et al. | 707/100 |
| 2008/0294603 A1 | 11/2008 | Ranjan | |
| 2009/0005968 A1* | 1/2009 | Vengroff et al. | 701/202 |
| 2009/0102859 A1 | 4/2009 | Athsani | |
| 2009/0132435 A1 | 5/2009 | Titus et al. | 705/400 |
| 2009/0138497 A1* | 5/2009 | Zavoli et al. | 707/102 |
| 2009/0210426 A1 | 8/2009 | Kulakov | |
| 2009/0217232 A1 | 8/2009 | Beerel | |
| 2009/0297118 A1 | 12/2009 | Fink | |
| 2009/0300528 A1 | 12/2009 | Stambaugh | 715/764 |
| 2009/0327232 A1 | 12/2009 | Carter | |
| 2010/0010907 A1 | 1/2010 | Dasgupta | |
| 2010/0076968 A1 | 3/2010 | Boyns et al. | 707/732 |
| 2010/0079338 A1 | 4/2010 | Wooden | |
| 2010/0145947 A1 | 6/2010 | Kolman et al. | 707/736 |
| 2010/0149399 A1 | 6/2010 | Mukai | |
| 2010/0153386 A1 | 6/2010 | Tysowski | 707/736 |
| 2010/0153410 A1 | 6/2010 | Jin et al. | 707/758 |
| 2010/0174998 A1 | 7/2010 | Lazarus | |
| 2010/0177120 A1 | 7/2010 | Balfour | |
| 2010/0180001 A1 | 7/2010 | Hardt | |
| 2011/0007941 A1 | 1/2011 | Chen et al. | 382/103 |
| 2011/0010674 A1 | 1/2011 | Knize et al. | 715/849 |
| 2011/0035284 A1 | 2/2011 | Moshfeghi | |
| 2011/0072106 A1 | 3/2011 | Hoffert | |
| 2011/0078584 A1 | 3/2011 | Winterstein et al. | 715/751 |
| 2011/0083013 A1* | 4/2011 | Nice et al. | 713/168 |
| 2011/0113096 A1 | 5/2011 | Long et al. | 709/204 |
| 2011/0123066 A9 | 5/2011 | Chen et al. | 382/103 |
| 2011/0131496 A1 | 6/2011 | Abram et al. | 715/722 |
| 2011/0137561 A1 | 6/2011 | Kankainen | |
| 2011/0142347 A1 | 6/2011 | Chen et al. | 382/190 |
| 2011/0153368 A1 | 6/2011 | Pierre | |
| 2011/0202544 A1 | 8/2011 | Carle | |
| 2011/0227699 A1 | 9/2011 | Seth | |
| 2011/0270940 A1 | 11/2011 | Johnson | |
| 2011/0288917 A1 | 11/2011 | Wanek et al. | 705/14.5 |
| 2011/0307307 A1 | 12/2011 | Benmbarek | |
| 2012/0001938 A1 | 1/2012 | Sandberg | 345/633 |
| 2012/0047219 A1 | 2/2012 | Feng et al. | 709/207 |
| 2012/0078503 A1 | 3/2012 | Dzubay et al. | 701/410 |
| 2012/0084323 A1 | 4/2012 | Epshtein et al. | 707/776 |
| 2012/0101880 A1 | 4/2012 | Alexander | |
| 2012/0124161 A1 | 5/2012 | Tidwell | |
| 2012/0150901 A1 | 6/2012 | Johnson et al. | 707/769 |
| 2012/0166367 A1 | 6/2012 | Murdock et al. | 706/12 |
| 2012/0212398 A1 | 8/2012 | Border | |
| 2012/0221687 A1 | 8/2012 | Hunter et al. | 709/219 |
| 2012/0232939 A1 | 9/2012 | Pierre | |
| 2012/0239763 A1 | 9/2012 | Musil | |
| 2012/0254774 A1 | 10/2012 | Patton | 715/758 |
| 2012/0259791 A1 | 10/2012 | Zoidze | 705/319 |
| 2012/0276848 A1 | 11/2012 | Krattiger et al. | 455/41.2 |
| 2012/0276918 A1 | 11/2012 | Krattiger et al. | 455/456.1 |
| 2012/0323687 A1 | 12/2012 | Schuster et al. | 705/14.57 |
| 2012/0330959 A1 | 12/2012 | Kretz et al. | 707/739 |
| 2013/0013713 A1 | 1/2013 | Shoham | |
| 2013/0018957 A1 | 1/2013 | Parnaby et al. | 709/204 |
| 2013/0051611 A1 | 2/2013 | Hicks | |
| 2013/0073388 A1 | 3/2013 | Heath | 705/14.53 |
| 2013/0073389 A1 | 3/2013 | Heath | |
| 2013/0073631 A1 | 3/2013 | Patton et al. | 709/204 |
| 2013/0110631 A1 | 5/2013 | Mitchell et al. | 705/14.58 |
| 2013/0110641 A1 | 5/2013 | Ormont | |
| 2013/0132194 A1 | 5/2013 | Rajaram | |
| 2013/0150015 A1* | 6/2013 | Valko et al. | 455/418 |
| 2013/0159463 A1 | 6/2013 | Bentley et al. | 709/217 |
| 2013/0201182 A1 | 8/2013 | Kuroki | |
| 2013/0238599 A1 | 9/2013 | Burris | 707/722 |
| 2013/0238652 A1* | 9/2013 | Burris | G06F 17/3087 707/769 |
| 2013/0238658 A1 | 9/2013 | Burris | 707/770 |
| 2013/0268558 A1 | 10/2013 | Burris | 707/770 |
| 2013/0346563 A1 | 12/2013 | Huang | 709/219 |
| 2014/0025911 A1 | 1/2014 | Sims | |
| 2014/0040371 A1 | 2/2014 | Gurevich | |
| 2014/0089296 A1 | 3/2014 | Burris | 707/722 |
| 2014/0089343 A1 | 3/2014 | Burris et al. | 707/770 |
| 2014/0089461 A1 | 3/2014 | Harris | |
| 2014/0095509 A1 | 4/2014 | Patton | 707/740 |
| 2014/0164368 A1 | 6/2014 | Mitchell | |
| 2014/0207893 A1 | 7/2014 | Harris | |
| 2014/0222950 A1 | 8/2014 | Rabel | |
| 2014/0258451 A1 | 9/2014 | Harris | |
| 2014/0259113 A1 | 9/2014 | Harris | |
| 2014/0274148 A1 | 9/2014 | Harris | |
| 2014/0280103 A1 | 9/2014 | Harris | |
| 2014/0280278 A1 | 9/2014 | Harris | |
| 2014/0280569 A1 | 9/2014 | Harris | |
| 2014/0297740 A1 | 10/2014 | Narayanan | |
| 2015/0019648 A1 | 1/2015 | Harris | |
| 2015/0019866 A1 | 1/2015 | Braness | |
| 2015/0020208 A1 | 1/2015 | Harris | |
| 2015/0032739 A1 | 1/2015 | Harris | |
| 2015/0172396 A1 | 6/2015 | Longo | |
| 2015/0256632 A1 | 9/2015 | Harris | |
| 2015/0381380 A1 | 12/2015 | Harris | |
| 2016/0006783 A1 | 1/2016 | Harris | |
| 2016/0014219 A1 | 1/2016 | Harris | |

FOREIGN PATENT DOCUMENTS

| | | |
|---|---|---|
| WO | WO 2010/049918 | 5/2010 |
| WO | WO 2013/133870 | 9/2013 |
| WO | WO 2013/134451 | 9/2013 |

OTHER PUBLICATIONS

U.S. Appl. No. 13/619,888, a non-final Office Action, mailed Mar. 1, 2013, 15 pages.

U.S. Appl. No. 13/708,466, a non-final Office Action, mailed Apr. 17, 2013, 15 pages.

(56) References Cited

OTHER PUBLICATIONS

U.S. Appl. No. 13/708,516, a non-final Office Action, mailed May 15, 2013, 11 pages.
U.S. Appl. No. 13/708,404, a Notice of Allowance, mailed May 24, 2013, 12 pages.
Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.
Bao, Jie, et al., "GeoFeed: A Location-Aware News Feed System", *IEEE Xplore® Digital Library*, Published in *2012 IEEE 28th International Conference on Data Engineering*, Apr. 1-5, 2012, 14 pages.
Sarwat, Mohamed, et al., "Sindbad: A Location-Based Social Networking System", *SIGMOD '12*, Scottsdale, Arizona, May 20-24, 2012, 4 pages.
U.S. Appl. No. 13/708,466, a Notice of Allowance, mailed Sep. 3, 2013, 11 pages.
U.S. Appl. No. 13/843,832, a non-final Office Action, mailed Sep. 13, 2013, 12 pages.
U.S. Appl. No. 13/284,455, a Notice of Allowance, mailed Oct. 4, 2013, 17 pages.
Amitay et al., "Web-a-Where: Geotagging Web Content", *Proceedings of the 27th Annual International ACM SIGIR Conference on Research and Development in Information Retrieval(SIGIR)*, 2004, pp. 273-280.
U.S. Appl. No. 13/284,455, a non-final Office Action, mailed Jun. 4, 2013, 28 pages.
U.S. Appl. No. 13/708,516, a Notice of Allowance, mailed Jun. 7, 2013, 14 pages.
U.S. Appl. No. 13/619,888, a Notice of Allowance, mailed Jul. 9, 2013, 10 pages.
U.S. Appl. No. 13/788,760, a Notice of Allowance, mailed Jul. 26, 2013, 12 pages.
U.S. Appl. No. 13/788,909, a non-final Office Action, mailed Aug. 12, 2013, 17 pages.
U.S. Appl. No. 13/843,949, a non-final Office Action, mailed Aug. 29, 2013, 12 pages.
U.S. Appl. No. 13/843,832, a Notice of Allowance, mailed Jan. 24, 2014, 6 pages.
U.S. Appl. No. 13/788,909, a Notice of Allowance, mailed Jan. 24, 2014, 12 pages.
U.S. Appl. No. 13/843,949, a Notice of Allowance, mailed Feb. 3, 2014, 11 pages.
Lee et al., "Tag-Geotag Correlation in Social Networks", *Proceedings of the 2008 ACM Workshop on Search in Social Media*, 2008, pp. 59-66.
U.S. Appl. No. 14/500,881, a non-final Office Action, mailed Sep. 21, 2015, 5 pages.
U.S. Appl. No. 13/788,909, a Notice of Allowance, mailed Jun. 24, 2014, 11 pages.
U.S. Appl. No. 13/843,832, a Notice of Allowance, mailed May 20, 2014, 7 pages.
U.S. Appl. No. 13/843,949, a Notice of Allowance, mailed May 9, 2014, 10 pages.
U.S. Appl. No. 14/089,631, a final Office Action, mailed Jan. 2, 2015, 8 pages.
U.S. Appl. No. 14/089,631, a non-final Office Action, mailed Jul. 8, 2014, 21 pages.
U.S. Appl. No. 14/089,631, a Notice of Allowance, mailed Feb. 2, 2015, 10 pages.
U.S. Appl. No. 14/108,301, a non-final Office Action, mailed Sep. 11, 2014, 10 pages.
U.S. Appl. No. 14/108,301, a Notice of Allowance, mailed Feb. 20, 2015, 13 pages.
U.S. Appl. No. 14/164,362, a non-final Office Action, mailed Oct. 23, 2014, 15 pages.
U.S. Appl. No. 14/164,362, a Notice of Allowance, mailed Feb. 24, 2015, 22 pages.
U.S. Appl. No. 14/180,473, a final Office Action, mailed Jan. 5, 2015, 7 pages.
U.S. Appl. No. 14/180,473, a non-final Office Action, mailed Jul. 8, 2014, 18 pages.
U.S. Appl. No. 14/180,473, a Notice of Allowance, mailed Jan. 27, 2015, 8 pages.
U.S. Appl. No. 14/180,845, a final Office Action, mailed Feb. 25, 2015, 32 pages.
U.S. Appl. No. 14/180,845, a non-final Office Action, mailed Aug. 27, 2015, 43 pages.
U.S. Appl. No. 14/180,845, a non-final Office Action, mailed Oct. 23, 2014, 32 pages.
U.S. Appl. No. 14/215,612, a final Office Action, mailed Nov. 28, 2014, 31 pages.
U.S. Appl. No. 14/215,612, a non-final Office Action, mailed Jul. 11, 2014, 16 pages.
U.S. Appl. No. 14/215,612, a non-final Office Action, mailed Aug. 18, 2015, 27 pages.
U.S. Appl. No. 14/500,832, a non-final Office Action, mailed May 21, 2015, 13 pages.
U.S. Appl. No. 14/512,293, a final Office Action, mailed Aug. 14, 2015, 15 pages.
U.S. Appl. No. 14/512,293, a non-final Office Action, mailed Jan. 28, 2015, 18 pages.
U.S. Appl. No. 14/666,056, a non-final Office Action, mailed Aug. 10, 2015, 17 pages.
U.S. Appl. No. 14/500,881, a non-final Office Action issued by Examiner Shanto Abedin, mailed Dec. 21, 2015, 24 pages.
U.S. Appl. No. 14/512,293, a non-final Office Action issued by Examiner Joshua Bullock, mailed Dec. 9, 2015, 14 pages.
U.S. Appl. No. 14/666,056, a Final Office Action issued by Examiner Djenane M. Bayard, mailed Jan. 4, 2016, 11 pages.
U.S. Appl. No. 14/813,031, a non-final Office Action issued by Examiner Matthew D. Henry, mailed Nov. 24, 2015, 23 pages.
U.S. Appl. No. 14/813,039, a non-final Office Action issued by Examiner Phuoc H. Nguyen, mailed Jan. 20, 2016, 20 pages.

\* cited by examiner

SYSTEM AND METHOD FOR DIFFERENTIALLY PROCESSING A LOCATION INPUT FOR CONTENT PROVIDERS THAT USE DIFFERENT LOCATION INPUT FORMATS

FIELD OF THE INVENTION

The disclosure relates to systems and methods for processing a location input that specifies one or more geographically definable locations for input to individual ones of a plurality of social media or other content providers that have different input formats for specifying locations.

BACKGROUND OF THE INVENTION

The availability of content such as videos, audio files, photos, and text over networks such as the Internet has grown at impressive rates. This growth has been fueled largely by the popularity of social media providers/platforms that register users, receive content from their users, and distribute the content to others. Put another way, users may be seen as content creators that publish their content through social media platforms. Other content creators publish content using their own websites and/or network-based exchanges and services such as online forums, chat rooms, and the like.

In many instances the created content can be automatically tagged with location information related to the content (e.g., where the content was created). Social media and other content providers oftentimes provide interfaces that allow location inputs to search for content based on the location information. However, different content providers have different formatting requirements for the location information. Thus, aggregating content from different content providers based on a location input may be difficult.

SUMMARY OF THE INVENTION

The disclosure relates to systems and methods for processing a location input that specifies one or more geographically definable locations for input to individual ones of a plurality of social media or other content providers that have different input formats for specifying locations.

In some embodiments, the system may include a computer that facilitates processing a location input. For example, the computer may format a location input to be compatible with different formats used by different content providers to receive the location input. In this manner, even though content providers may receive location inputs in a limited number of formats, the computer may receive location inputs according to a wide range of formats, allowing for flexible and scalable location input solutions for content aggregation based on location.

In some embodiments, the formatting may result in artifacts such as over-inclusive and/or under-inclusive results. For example, a location input by a user may be formatted into a zip code that does not entirely match the actual location input by the user. The zip code may include a greater and/or a lesser geographic area than the actual location input, leading to over-inclusive and/or under-inclusive results. The computer may be configured to compensate for such artifacts, thereby providing location input solutions that are scalable and address artifacts that may result from processing location inputs.

The computer may include one or more processors configured to perform some or all of a functionality of a plurality of modules. For example, the one or more processors may be configured to execute a geofeed creation module, a geo-location processing module, a geo-location correction module, a communication module, a user interface module, and/or other modules.

The geofeed creation module may be configured to receive a request to create a geofeed. The request to create the geofeed may include a specification of one or more geo-locations (hereinafter, a "geo-location specification"). The request may also include one or more geofeed parameters that may be used to filter content into the geofeed and/or out of the geofeed. The geo-location specification may be defined by one or more geo-location inputs. The geofeed creation module may receive a geo-location input. The geo-location input may comprise a map input, a text input, and/or other input. The geofeed creation module may generate a geofeed definition that includes the geo-location specification, the one or more geofeed parameters, and/or other information related to the geofeed. The geofeed definition may be updated. For example, the geo-location specification, the one or more geofeed parameters, and/or other information of the geofeed definition may be updated. In this manner, various parameters related to geofeeds may be defined and updated at the time of specifying the geofeeds and/or after the geofeeds have been specified.

A first content provider may accept a first geo-location input format that is different from a second geo-location input format of a second content provider. The geo-location input may not be compatible with the first geo-location input format and/or the second geo-location input format. The geo-location processing module may normalize the geo-location input to be compatible with the first geo-location input format to obtain content from the first content provider and may normalize the geo-location input to be compatible with the second geo-location input format to obtain content from the second content provider.

The geo-location correction module may be configured to determine whether the received content is over-inclusive and/or under-inclusive based on the original geo-location input. Based on the determination, the geo-location correction module may remove and/or add content.

The communication module may be configured to communicate one or more geofeeds generated based on the geo-location input. In some embodiments, the communication module may communicate formatting results, correction results, and/or other information related to processing location inputs.

The user interface module may be configured to generate a user interface that communicates and/or displays one or more geofeeds. The content consumer device may display a user interface provided by the user interface module, which a content consumer may use to request a geofeed.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

Figure 1:
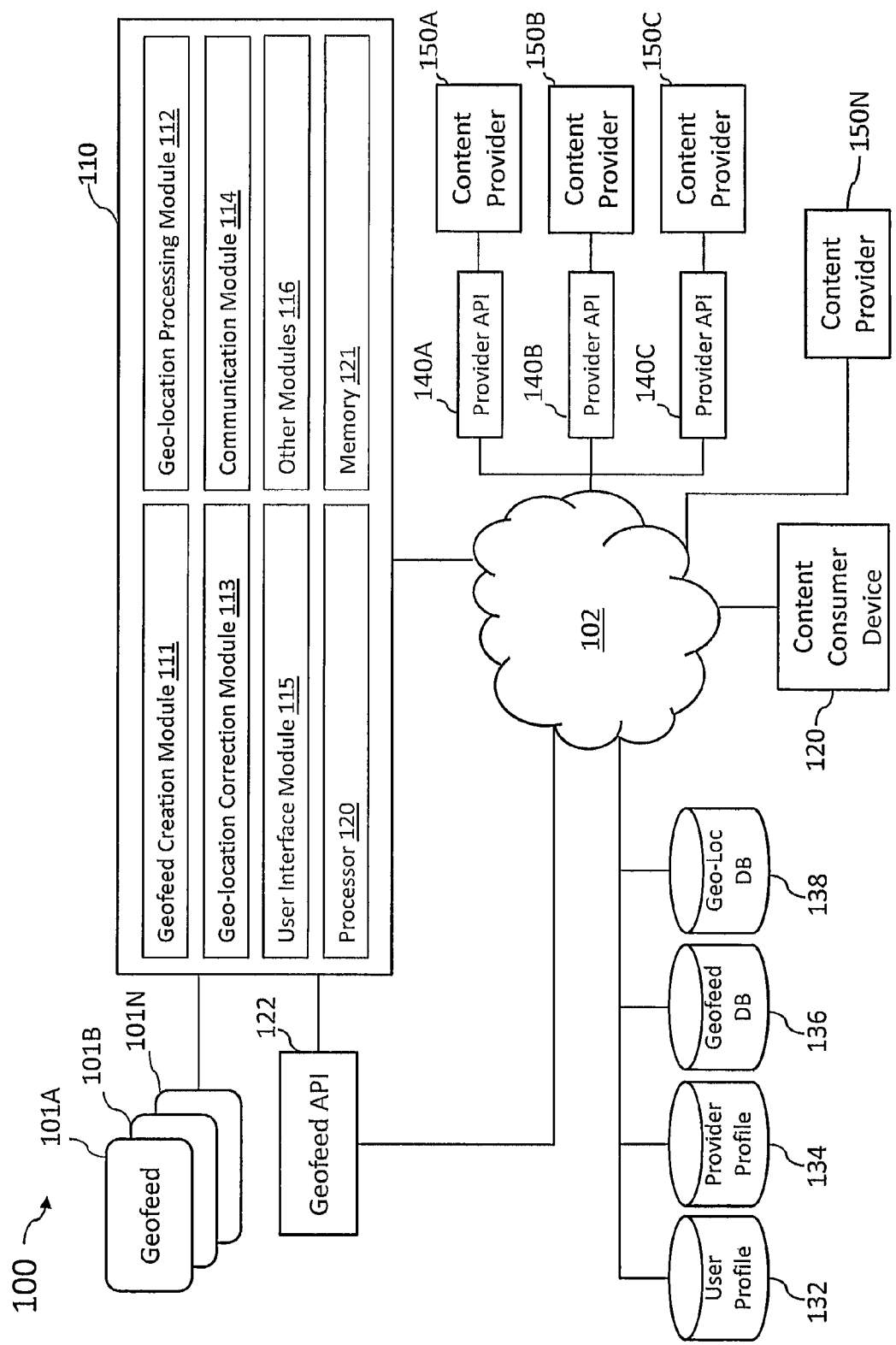
FIG. 1 illustrates a system for processing a geo-location input to generate a geofeed, according to an aspect of the invention.

FIG. 1 illustrates a system 100 of processing a geo-location input to generate a geofeed, according to an aspect of the invention. A geofeed includes a collection of content, aggregated from various content providers, that is relevant to a geographically definable location (hereinafter, a "geo-location"). The aggregated content (also referred to herein as "geofeed content") may include, for example, video, audio, images, text, hyperlinks, and/or other content that may be relevant to a geo-location.

The geo-location may be specified by various input mechanisms (hereinafter, "geo-location inputs") including map inputs and/or text inputs. Map inputs may include a specification of a geographical area bounded by a circle, polygon, visible area of the screen, and/or other non-circular shape drawn using a map interface. Text inputs may include a geo-coordinate (e.g., latitude, longitude, altitude/depth), an address, a school, a place name, a point of interest (e.g., "White House"), a zip code, a city, a state, a country, and/or other information that can spatially identify a geographical area. As used hereinafter, "a location," "a geo-location," "a geographically definable location," and similar language is not limited to a single location but may also refer to one or more such location.

The content providers may include, for example, social media platforms (e.g., FACEBOOK, TWITTER, INSTAGRAM, FLICKR, etc.), online knowledge databases, and/or other providers that can distribute content that may be relevant to a geo-location. The content may be generated by content sources such as individuals, corporations, and/or other entities that may create content.

In many instances the created content can be automatically tagged with information such as user identifications, date/time information or geographic information that specifies a location where the content was created. For example, cameras equipped with Global Positioning Satellite ("GPS") units or other location-aware systems may embed into an image file latitude/longitude coordinates that indicate where a picture was taken. In addition, modern hand-held devices such as smartphones may be equipped with a GPS sensor, which allows users to generate content (e.g., video, audio, images, text, hyperlinks, etc.) with their devices and immediately share the content through a plurality of social networks. Moreover, some devices allow users to manually input the foregoing and other information for embedding into the content. Furthermore, editing software may allow a user to embed or otherwise associate information along with the content after the content was created.

System 100 may include a computer 110, a geofeed API 122, a content consumer device 120, provider APIs 140, content providers 150, and/or other components. In some embodiments, computer 110 may include one or more processors configured to perform some or all of functionality of a plurality of modules. For example, the one or more processors may be configured to execute a geofeed creation module 111, a geo-location processing module 112, a geo-location correction module 113, a communication module 114, a user interface module 115, and/or other modules 116.

Geofeed creation module 111 may be configured to create one or more geofeeds 101 (illustrated in FIG. 1 as geofeed 101A, 101B, . . . , 101N), as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012, entitled "SYSTEM AND METHOD FOR GENERATING, ACCESSING, AND UPDATING GEOFEEDS" both of which are incorporated by reference herein in their entirety.

Co-pending applications filed concurrently herewith, U.S. patent application Ser. No. 13/788,760, entitled "SYSTEM AND METHOD FOR CREATING AND MANAGING GEOFEEDS," and co-pending application filed concurrently herewith, U.S. patent application Ser. No. 13/788,909, entitled "SYSTEM AND METHOD FOR TARGETED MESSAGING, WORKFLOW MANAGEMENT, AND DIGITAL RIGHTS MANAGEMENT FOR GEOFEEDS," are all incorporated by reference in their entireties herein.

Co-pending U.S. patent application Ser. No. 13/708,516, filed Dec. 7, 2012, entitled "SYSTEM AND METHOD FOR LOCATION MONITORING BASED ON ORGANIZED GEOFEEDS," co-pending U.S. patent application Ser. No. 13/708,404 (issued on Jul. 9, 2013 as U.S. Pat. No. 8,484,224), filed Dec. 7, 2012, entitled "SYSTEM AND METHOD FOR RANKING GEOFEEDS AND CONTENT WITHIN GEOFEEDS," and co-pending U.S. patent application Ser. No. 13/708,466, filed Dec. 7, 2012, entitled "SYSTEM AND METHOD FOR GENERATING AND MANAGING GEOFEED BASED ALERTS" are all incorporated by reference in their entireties herein.

For example, geofeed creation module 111 may be configured to receive a request to create a geofeed. The request to create the geofeed may include a specification of one or more geo-locations and one or more geofeed parameters such as, for example, providers to include (or exclude), types of content to include (or exclude), date ranges, content matching patterns, keywords, and/or other parameters that instruct the system as to which content should be included in the geofeed.

In some embodiments, geofeed creation module 111 may be configured to generate a geofeed based on the geo-location specification and/or geofeed parameters. Geofeed creation module 111 may request or otherwise crawl content that may be relevant to the geo-location from content providers 150. Typically, although not necessarily, geofeed creation module 111 may request and receive the content via various Application Programming Interfaces ("APIs") 140 (illustrated in FIG.

1 as API 140A, API 140B, ..., API 140C) exposed by content providers 150. In other instances, geofeed creation module 111 may simply request and/or receive content from content providers 150 without using an API such as by crawling a website of the provider or otherwise requesting content without an API. Data input to and output from a content provider 150 hereinafter will be described with respect to an API 140 for convenience, although processing may be similarly applied to interfacing with a content provider without using an API.

In some embodiments, the geo-location specification may include one or more geo-location inputs. For example, geofeed creation module 111 may be configured to receive a geo-location input that specifies the geo-location via content consumer device 120 using an interface exposed by computer 110. The interface may include a map interface and/or other interface that receives a boundary of the geo-location. The map interface may include a map input that allows the content consumer or other user to designate an outline on the map, zoom in or out of the map, and/or pan the map to specify the geo-location. Other interfaces may include a text input that allows the user to input (e.g., type) a geo-coordinate (e.g., latitude, longitude, altitude/depth), an address, a school, a place name, a point of interest (e.g., "White House"), a zip code, a city, a state, a country, and/or other information that can specify a geo-location. In some embodiments, the geo-location may be calculated based on a current location of a device such as content consumer device 120. In some embodiments, the geo-location may be obtained from a third party location provider. In these embodiments, for example, a location input may include a point of interest and the third party location provider may return one or more coordinates or other location information related to the point of interest. The location information from the third party location provider may be formatted as described herein.

Geo-location processing module 112 may be configured to obtain the geo-location input and/or normalize the geo-location input into a format that is compatible with computer 110 and/or different content providers 150. The geo-location input may be received via one or more user interfaces, from an automated process (e.g., a computer process), and/or other input source.

In some embodiments, geo-location processing module 112 may normalize the geo-location input into an intermediate format that may be recognized by and/or be compatible with computer 110. The intermediate format may then be converted to a format that is compatible with different content providers 150 and/or their corresponding provider APIs 140. In some embodiments, the geo-location input may be directly normalized into a format that is compatible with different content providers 150 and/or their corresponding provider APIs 140 without initially normalizing the geo-location input into the intermediate format.

In some embodiments, geo-location processing module 112 may be configured to format the geo-location input specific for different provider APIs 140 (illustrated in FIG. 1 as API 140A, 140B, 140C). The provider APIs may facilitate receiving content from corresponding content providers 150 (illustrated in FIG. 1 as content providers 150A, 150B, 150C). In some embodiments, geo-location processing module 112 may format the geo-location input directly for content provider 150N without using a corresponding API. For example, the various content providers 150 may accept different geo-location input formats. In this example, content provider 150A may receive a geo-location input in a point (e.g., latitude and longitude geo-coordinates) and radius input format while another provider 150B may receive a plurality of geo-coordinates indicating a boundary of a non-circular shape (e.g., rectangle) as an input to retrieve content. Yet another provider 150C may receive a zip code, a city, a state, a country, and/or other input formats. As such, the geo-location input initially received by geofeed creation module 111 may not be compatible with the geo-location input format that may be acceptable by a particular content provider from which the content is to be requested. As such, geo-location processing module 112 may format the geo-location input to be compatible with a corresponding provider API 140.

In some embodiments, geo-location processing module 112 may be configured to use a provider profile associated with each provider 150A-C in order to format the geo-location input so that the geo-location input is compatible with each API. Provider profiles may be stored in a provider profile database 134. The provider profiles may include information related to a content provider such as, for example, a geo-location input format acceptable by the content provider and/or rules (and/or other intelligence) used to format geo-location inputs to be compatible with different content providers.

Geo-location processing module 112 may be configured to obtain a geo-location input based on a map input, a text input, and/or other inputs. Map inputs may include a specification of a geographical area bounded by a circle, polygon, visible area of a map interface, and/or other shape input (e.g., drawn) using the map interface. Text inputs may include a geo-coordinate (e.g., latitude, longitude, altitude/depth), an address, a school, a place name, a point of interest (e.g., "White House"), a zip code, a city, a state, a country, and/or other information that can spatially identify a geographical area.

In some embodiments, a user may specify a map input using the map interface exposed by computer 110. Geo-location processing module 112 may obtain a specification of a geographical area bounded by the map input as a geo-location input. For example, content provider 150A may require a point and radius input format. If the map input is a circle, geo-location processing module 112 may determine the point and radius of the circle and request content from content provider 150A based on the point and radius. In this case, the content received from content provider 150A may be coextensive with the geographical area defined by the circle without being over-inclusive or under-inclusive because the map input is compatible with the input format of the content provider. In other words, geo-coordinates associated with individual items of the received content may all be located within the circle.

On the other hand, if the map input is not compatible with the input format of the content provider (such as point and radius input) geo-location processing module 112 may normalize the map input to be compatible with the input format of the content provider. For example, when the original geo-location input includes a polygon, geo-location processing module 112 may normalize the polygon by generating a circle that corresponds to the polygon. In this manner, a point and radius of the circle may be obtained in order to request content from content provider 150A based on the point and radius input requirement of the content provider. As would be appreciated, the geo-coordinates corresponding to portions of the circle may be mapped to the geo-coordinates corresponding to the polygon input using conventional coordinate transformation techniques.

In some embodiments, in order to determine a circle that covers the area specified by the polygon, geo-location processing module 112 may identify a centroid and a plurality of corners of the polygon and/or measure the distance between the centroid and individual ones of the plurality of corners. Geo-location processing module 112 may determine the formatted geo-location input based on the centroid as a center of the circle and the longest distance as a radius of the circle.

The formatting may cause artifacts such as over-inclusive and/or under-inclusive results. For example, if the formatted geo-location input represented by the circle is made larger than the polygon (covering the entire area of the polygon), the content received from content provider 150A may be over-inclusive such that it includes extraneous content whose associated geo-coordinates are located within the formatted geo-location input (e.g., circle) but outside of the map input (e.g., polygon). On the other hand, if the formatted geo-location input represented by the circle is smaller than the polygon, the received content based on the formatted geo-location (e.g., circle) may be under-inclusive where it may not include content whose locations are just outside of the circle but still within the polygon. In these instances, the geo-location correction module described herein may compensate for such artifacts.

In some embodiments, geo-location processing module 112 may divide the map input into a plurality of segments using various segmentation techniques. In some embodiments, the plurality of segments may be individually normalized. The plurality of formatted geo-location inputs for the segments may be aggregated into a single input which may be communicated to a corresponding content provider and/or be separately input to the corresponding content provider.

Continuing the foregoing non-limiting example where content provider 150A accepts a point and radius input format, geo-location processing module 112 may divide the geographically area defined by a polygon into multiple segments. Individual segments may be normalized such as by creating one or more circles corresponding to individual segments. Various ways to normalize a non-circular map input such as a polygon into a circle discussed herein may similarly apply to the process of normalizing a non-circular segment of the polygon into a circle and/or other shapes received as input by content providers. Once a plurality of circles corresponding to the polygon is determined, geo-location processing module 112 may request content from content provider 150A based on the point and radius information associated with the plurality of circles.

In some embodiments, content provider 150B may require a zip code (and/or neighborhood, city, state, etc. and/or any other non-circular shaped geographical area) as an input format. In these embodiments, geo-location processing module 112 may normalize the map input into a zip code of that at least partially corresponds with a geographic area specified by the map input. The geographical area of the zip code may be larger than (e.g., over-inclusive), and/or smaller than (e.g., under-inclusive) the area bounded by the map input. If a geographic area of the zip code is larger than the map input, the content received from content provider 150B based on the formatted geo-location input (e.g., zip code) may include extraneous content whose associated locations are outside of the map input but within the formatted map input. If a geographic area of the zip code is smaller than the area bounded by the map input, the received content based on the zip code may not include (therefore under-inclusive) content whose locations are just outside of the zip code but still within the map input.

In some embodiments, the geographic area bounded by a map input may overlap with more than one zip code (and/or neighborhood, city, state, etc. and/or any other non-circular shaped geographical area). In this case, geo-location processing module 112 may identify a plurality of zip codes that cover and/or is related to the geographical area bounded by the particular map input and request content from content provider 150B based on the plurality of zip codes.

In some embodiments, geo-location processing module 112 may receive a geo-location input specifying a dimension (e.g., length, width, area, etc.) that is larger than a maximum input area dimension allowable for a given content provider 150. For example, the geo-location input may specify a 50-km wide location in which to search whereas a particular content provider 150 may require a location input that specifies an area no greater than a 5-km wide location input. Still another content provider 150 may require a location input that specifies an area no greater than a 10-km wide location input. As described herein, different content providers 150 may further require different types of inputs (e.g., center/radius, bounded box, etc.).

In these embodiments geo-location processing module 112 may normalize the geo-location input (e.g., the 50-km wide location) for individual content providers and may determine the number of requests to be made based on particular requirements of the different content providers 150 from which content is obtained. For example, geo-location processing module 112 may be configured to determine a minimum number of requests to be made to a content provider 150 based on the maximum location size that the content provider receives. In the foregoing example, geo-location processing module 112 may generate a first plurality of segments individually spanning 5-km for a first content provider 150 and a second plurality of segments individually spanning 10-km for a second content provider 150. For each content provider, geo-location processing module 112 may normalize the geo-location input as well, such as by using a point-and-radius for the first content provider and a bounded box for the second content provider. The requirements for normalization may be stored in a content provider profile as described herein and/or co-pending applications.

Returning to the example, for input to individual content providers, geo-location processing module 112 may layout the plurality of segments in a manner that minimizes overlap and maximizes coverage of the geo-location input. In some embodiments, conventional best-fit techniques may be used to layout the plurality of segments. In some embodiments, for example, geo-location processing module 112 may layout the plurality of 5-km wide location input segments for the first content provider and layout the plurality of 10-km wide location input segments for the second content provider in a manner that minimizes overlap and maximizes coverage of the geo-location input. In a particular example, geo-location processing module 112 may position a segment at a first position and position subsequent segments until a boundary of the geo-location input is reached. Geo-location processing module 112 may continue this process in each direction as appropriate, depending on the size and/or shape of the geo-location specified by the geo-location input. The size and/or shape of each segment may depend on the type of input (e.g., point-and-radius, bounded box, etc.) accepted by the content provider for geo-location input.

In some embodiments, a user may specify a text input using a text interface and/or other interfaces exposed by computer 110. For example, geo-location processing module 112 may normalize the text input such as a geo-coordinate, an address, a school, a place name, a point of interest, etc. into a point that defines a geographic center of the text input and determine a radius about the center to approximate the geographic region of the text input. Geo-location processing module 112 may convert the text input into geo-coordinates to determine the geographic center of a geographic area defined by the text input. In some embodiments, geo-location processing module 112 may access geo-location database 138 to obtain and/or retrieve geo-coordinates that are associated with a particular address, name of a place, a point of interest, etc. Geo-location processing module 112 may request content from content provider 150A, which may require a point and radius input format based on the determined point and radius. The radius may also be predetermined by computer 100, by individual content providers, and/or by user input.

In another example, geo-location processing module 112 may normalize the text input into a zip code, neighborhood, city, etc. to which the geo-location related to the text input belongs in order to request content from content provider 150B which may require such an input format.

In some embodiments, the text inputs may be translated into map inputs which may then be used to request content from content providers. For example, geo-location processing module 112 may obtain a zip code as a text input. Using a map interface exposed by computer 110, geo-location processing module 112 may identify a geographical area bounded by a map input such as a polygon that represents the area covered by the zip code. In another example, a text input such as "White House" may be converted to a map input such as a polygon indicating an area surrounding the White House.

In some embodiments, geo-location processing module 112 may be configured to store the geo-location specification defined by a geo-location input and/or other information related to the request to create a geofeed as a geofeed definition in a geofeed database 136. The geofeed definition may include information that allows geofeed creation module 111 and/or other components of the system to generate a geofeed that was previously requested using the geo-location specification and/or other information related to the geofeed. In this manner, a content consumer or other user need not re-enter the geo-location input in order to view the geofeed defined by the geofeed definition.

In some embodiments, geo-location processing module 112 may access a geo-location database 138 (illustrated in FIG. 1 as "Geo-Loc DB 138"), which may be located locally and/or remotely at a $3^{rd}$ party site, to obtain geographic information related to the text input. For example, geo-location processing module 112 may retrieve a predefined polygon associated with a particular point of interest such as the White House and/or convert the text input to a map input based on the predefined polygon.

In some embodiments, geo-location inputs obtained by geo-location processing module 112 may be stored in and/or retrieved from a user profile database 132. For example, a user profile may include information related to a user (e.g., a content consumer) such as, for example, prior geo-location specifications.

In some embodiments, when content is received from one or more of the various content providers, the system may store the content (as allowed by law or terms of service) and/or links to the content in a manner that associates the content and/or links with a standard location format. In this manner, once the geo-location input has been normalized for input to the content providers and the content has been received, subsequent searches on the stored content and/or links may use the standard location format used by the system. The standard location format may be based on a point-and-radius, bounded box, and/or other geo-location specifying format.

Geo-location correction module 113 may be configured to determine whether the received content is over-inclusive and/or under-inclusive based on the original geo-location input. For example, geo-location correction module 113 may determine a location associated with individual content and determine whether the location is within the original geo-location input.

When the received content includes excess content such as content that is within a geographic area defined by the formatted geo-location input but outside of a geographic area defined by the original geo-location input, geo-location correction module 113 may remove the extraneous content. For example, geo-location correction module 113 may identify an item of the content to be removed by comparing geo-coordinates of that content item with geo-coordinates associated with the original geo-location input (e.g., geo-coordinates associated with various points along the perimeter of the geographic area bounded by the geo-location input). In this manner, even if a particular content provider provides only an input mechanism that broadly defines a geo-location such as a zip code, geo-location correction module 113 may be used to fine-tune the content received from the content provider.

In some embodiments, the extraneous content that have been removed by geo-location correction module 133 may be tracked, stored in a database such as geofeed database 136, and/or communicated to the user. In this manner, the content consumer may be informed of the content items that were removed (and may be available to access if the geo-location input is enlarged).

When the received content is under-inclusive, geo-location correction module 113 may identify additional content items that are located inside of the original geo-location input and/or add those items to the geofeed.

Communication module 114 may be configured to communicate one or more geofeeds generated by geofeed creation module 111. In some embodiments, the communication module may communicate formatting results, correction results, and/or other information related to processing location inputs.

User interface module 115 may be configured to generate a user interface that communicates and/or displays one or more geofeeds. The user interface may include a web page, an application executing on a mobile device, or other interface that can receive inputs and/or communicate outputs. For example, content consumer device 120 may display a user interface provided by user interface module 115, which a content consumer may use to request a geofeed.

Exemplary screenshots of interfaces generated by user interface module 115 are illustrated in FIGS. 4-11.

Those having skill in the art will recognize that computer 110 and content consumer device 120 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 120. In one implementation, computer 110 and consumer device 120 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
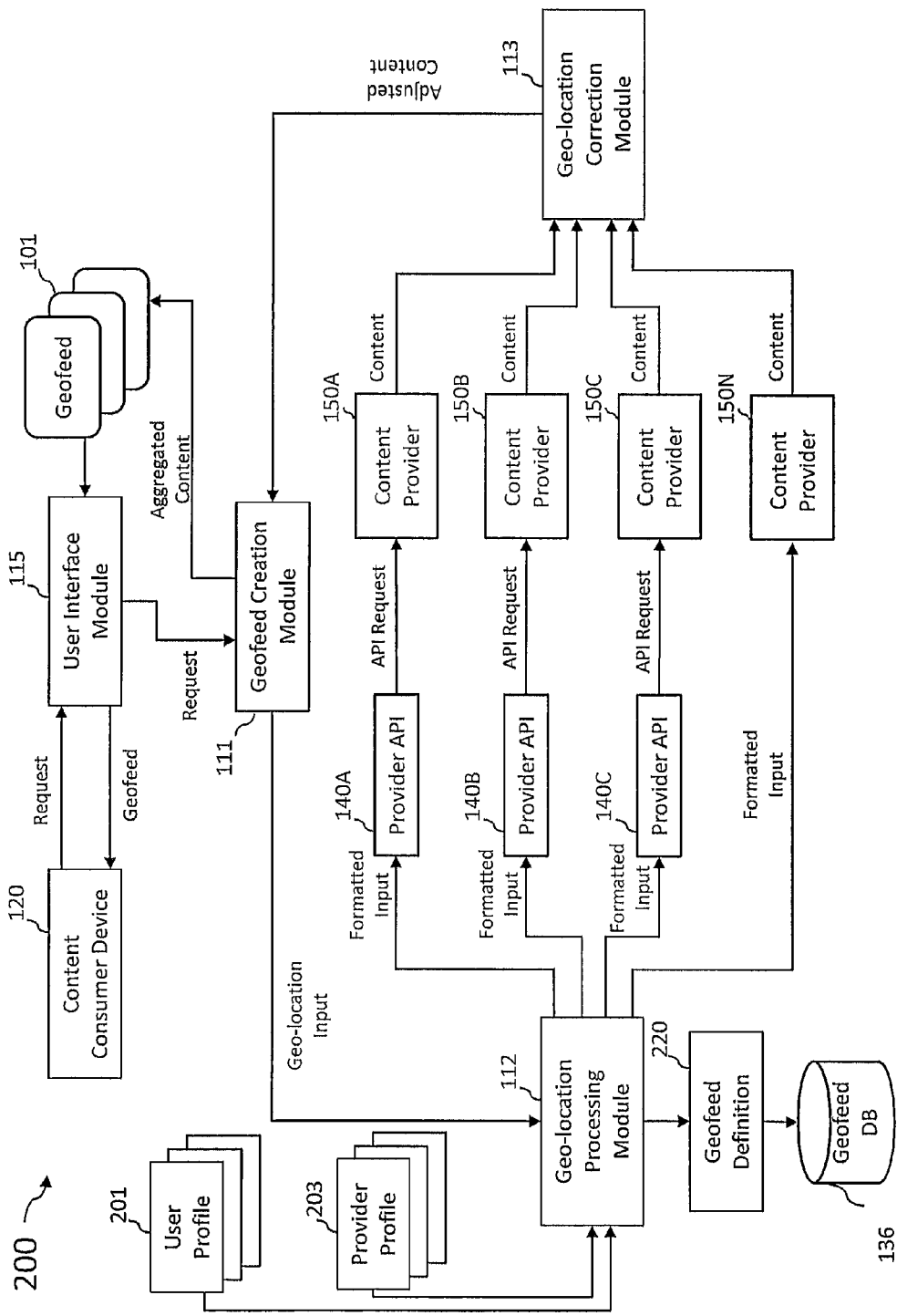
FIG. 2 illustrates a data flow diagram for a system for processing a geo-location input to generate a geofeed, according to an aspect of the invention.

FIG. 2 illustrates a data flow diagram 200 for a system for processing a geo-location input to generate a geofeed, according to an aspect of the invention. Geofeed creation module 111 may generate a geofeed 101 based on a geo-location input that may be processed through various modules including, for example, geo-location processing module 112 and/or geo-location correction module 113.

In some embodiments, geofeed creation module 111 may receive the request and communicates the geo-location input of the request to geo-location processing module 112 to process the geo-location input.

Geo-location processing module 112 may obtain the geo-location input and/or normalize the geolocation input into a format that is compatible with different content providers 150. For example, the request may include a geo-location input that is an address, while content provider 150A may take as input a point and radius location for defining a geo-location and content provider 150B may take as input a zip code for defining the geo-location. As such, geo-location processing module 112 may format the geo-location input so that it conforms to a corresponding provider 150.

Geo-location processing module 112 may normalize the geo-location input from the request to be compatible with API 140A and API 1408. For example, geo-location processing module 112 may normalize the address into a point that defines a geographic center of the address and determine a radius about the center to approximate the geographic region of the address in order to request content from provider 150A using API 140A. On the other hand, geo-location processing module 112 may normalize the address into a zip code of which the address is a part in order to request content from provider 150B using API 140B.

In some embodiments, a content provider may not expose an API. In these embodiments, geo-location processing module 112 may normalize the geo-location input to be compatible with provider 150N. For example, geo-location processing module 112 may request content from provider 150N directly by crawling a website of provider 150N, executing search queries on a search module of provider 150N and/or using other techniques to access content from provider 150N.

Geo-location processing module 112 may store the geo-location specification defined by a geo-location input and/or other information related to the request to create a geofeed as a geofeed definition in a geofeed database 136.

Geo-location processing module 112 may obtain various profiles such as a user profile (201) and/or a provider profile (203). The provider profile (203) may include information related to a content provider such as, for example, a geo-location input format acceptable by the content provider and/or rules (and/or other intelligence) used to format geo-location inputs to be compatible with different content providers. The user profile (201) may include information related to a content consumer such as, for example, prior geo-location specifications.

In some instances, the content from providers 150 may be over-inclusive or under-inclusive because of the normalization process (e.g., a zip code may return more results than a particular address). Geo-location correction module 113 may adjust the over-inclusive (or under-inclusive) content using various techniques discussed herein with respect to FIG. 1.

Geofeed creation module 111 may aggregate the received content, which may or may not be adjusted by geo-location correction module 113 and generate a geofeed based on the aggregated content. The geofeed may be communicated to the content consumer via the user interface communicated via user interface module 115 and/or other communication channel. Examples of various user interfaces are described with respect to FIGS. 4-11.

Figure 3:
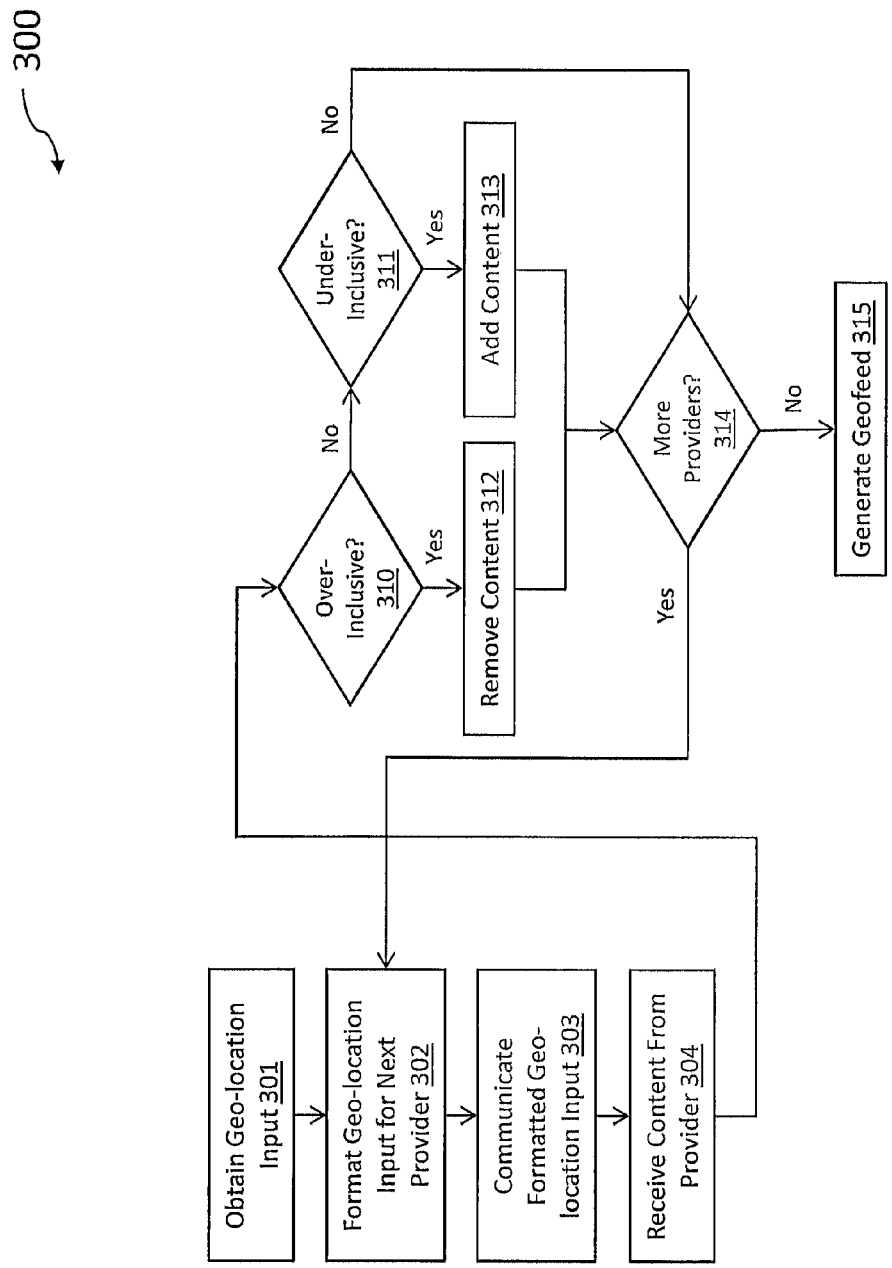
FIG. 3 illustrates a process for processing a geo-location input to generate a geofeed, according to an aspect of the invention.

FIG. 3 illustrates a process 300 for processing a geo-location input to generate a geofeed, according to an aspect of the invention. The various processing operations and/or data flows depicted in FIG. 3 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 301, process 300 may include obtaining a geo-location input which may be a map input and/or a text input. In an operation 302, process 300 may include normalizing the geo-location input into a format that is compatible with the next provider from which content is received. In an operation 303, process 300 may include communicating the formatted geo-location input to the next provider. In an operation 304, process 300 may include receiving the content requested based on the formatted geo-location input from the provider.

In an operation 310, process 300 may include determining whether the received content is over-inclusive such that it contains excess content whose associated locations are within the area specified by the formatted geo-location input but outside of the area specified by the original geo-location. If the received content is over-inclusive, process 300 may include removing the excess content from the received content in an operation 312. On the other hand, if the received content is not over-inclusive, process 300 may include determining whether the received content is under-inclusive such that there may be additional content that are located just outside of the area specified by the formatted geo-location input but still within the area specified by the original geo-location input in an operation 311. If the received content is under-inclusive, process 300 may include adding the additional content to the received content in an operation 313. On the other hand, if the received content is not under-inclusive, process 300 may include determining whether more providers are to be queried for content. If more providers remain, process 300 may return to operation 302, where the geo-location input is normalized for the next provider. If no more providers remain, in an operation 315, process 300 may include generating the geofeed.

Figure 4:
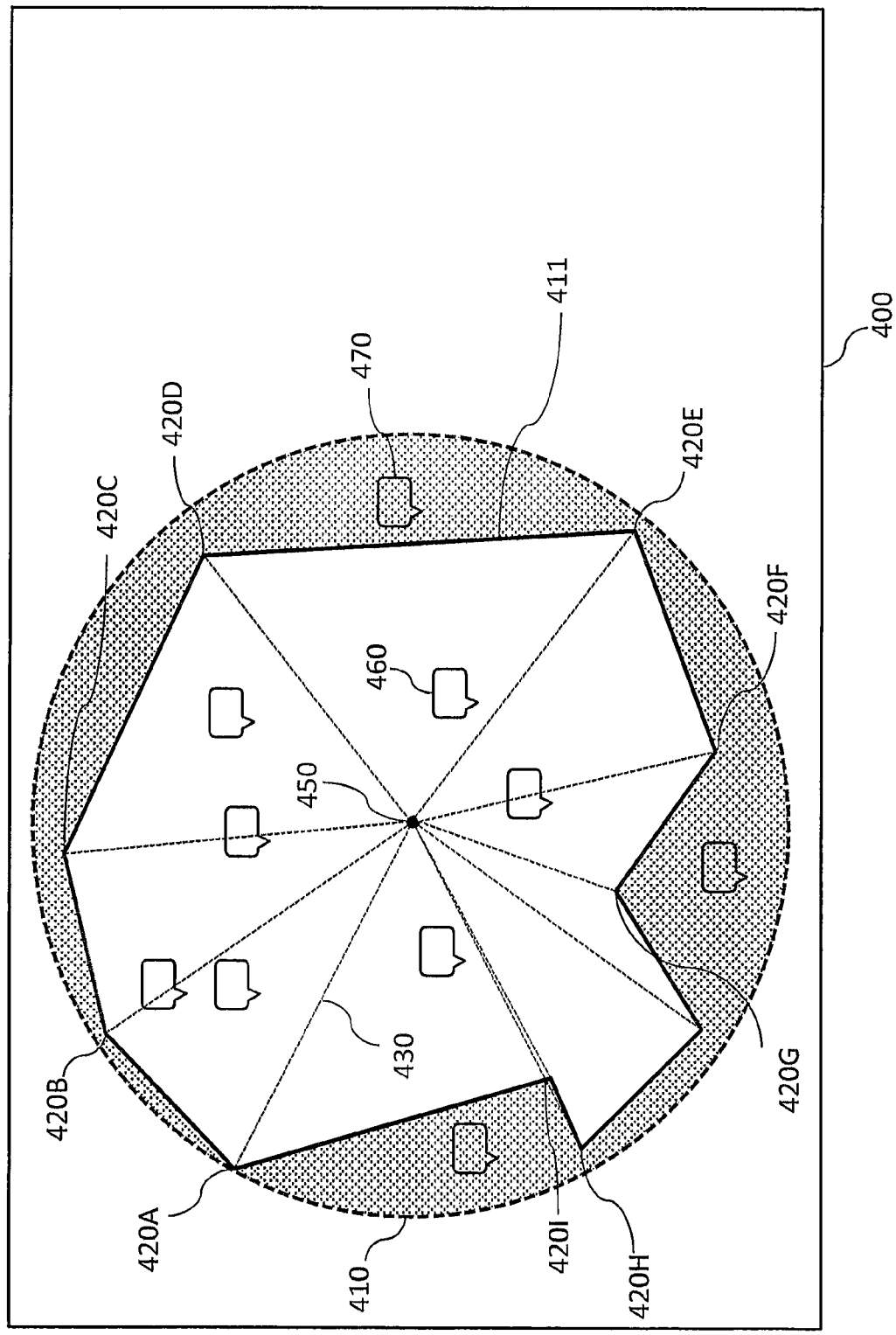
FIG. 4 illustrates a screenshot of an interface for communicating a geofeed generated based on a geo-location input shaped as a polygon, according to an aspect of the invention.

FIG. 4 illustrates a screenshot of an interface 400 for communicating a geofeed generated based on a geo-location input shaped as a polygon, according to an aspect of the invention. The screenshots illustrated in FIG. 4 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 400 and other interfaces described herein may be implemented as a web page communicated from computer 110 to a client, an application such as a mobile application executing on the client that generates the interface based on information communicated from computer 110, and/or other interface. Whichever type of interface is used, computer 110 may communicate the data and/or formatting instructions related to the interface to the client, causing the client to generate the various interfaces of FIG. 4 and other drawing figures. Furthermore, computer 110 may receive data from the client via the various interfaces, as would be appreciated.

Referring to FIG. 4, interface 400 may provide a geofeed that may be generated based on a geo-location input and a formatted geo-location input that has been created by normalizing the geo-location input. For example, a content consumer may specify locations of interest by drawing a polygon 411 via interface 400. As illustrated, polygon 411 indicates a boundary of a geo-location for a geofeed. Other polygons and/or other shapes (not illustrated) may indicate other boundaries of other geo-locations for the geofeed. Polygon 411 may be normalized into an input format that may be compatible with a particular content provider, which may, as illustrated, take as input a point and radius input. During the normalization and/or formatting process, a centroid 450 of polygon 411 and corners 420A-I of polygon 411 may be identified. Based on centroid 450 and corner 420A having the longest distance (illustrated by a dotted line 430) from centroid 450, the formatted geo-location input may be formed and/or used to request content from the content provider.

The content received from the content provider based on centroid 450 and distance 430 may include excess content that is outside of the area represented by polygon 411. Such excess content such as a content item 470 may be located in the shaded area of a circle 410. Content item 470 may be removed from the received content whereas content such as a content item 460 that are within polygon 411 may be added to the geofeed.

Figure 5:
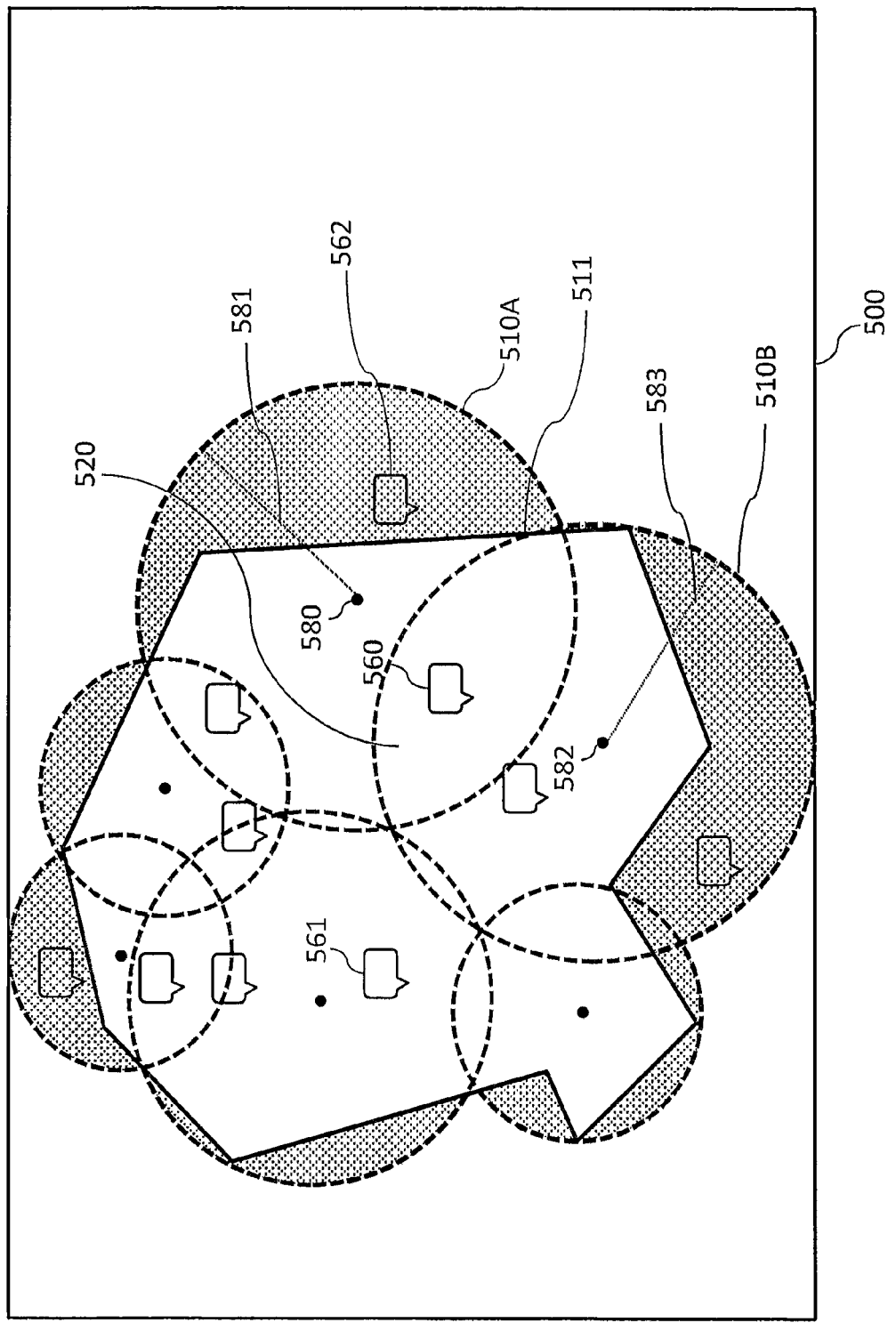
FIG. 5 illustrates a screenshot of an interface for communicating a geofeed generated based on a geo-location input shaped as a polygon, according to an aspect of the invention.

FIG. 5 illustrates a screenshot of an interface 500 for communicating a geofeed generated based on a geo-location input shaped as a polygon, according to an aspect of the invention.

Referring to FIG. 5, interface 500 may provide a geofeed that may be generated based on a geo-location input and a formatted geo-location input that has been created by normalizing the geo-location input. For example, a user may specify locations of interest by drawing a polygon 511 via interface 500. As illustrated, polygon 511 is displayed that indicates a boundary of a geofeed. Polygon 511 may be normalized into an input format that may be acceptable for a particular content provider, such as a point and radius input. During the normalization and/or formatting process, polygon 511 may be divided into a plurality of segments where individual segments may be separately normalized into a point and radius format. In this example, polygon 511 has been divided into 6 different segments. As illustrated, circles 510A and 510B may be formed around corresponding segments. Content may be requested from the content provider based on the point and radius information determined by the circles formed around the segments (such as a center 580, a radius 581, a center 582, and a radius 583).

The content received from the content provider based on the point and radius information may include excess content that is outside of the area represented by polygon 511. Such excess content such as a content item 562 may be located in the shaded area of the circles. Content item 562 may be removed from the received content whereas content such as a content item 561 that are within polygon 511 may be added to the geofeed.

In some embodiments, a region 620 in which two or more circles overlap may include duplicate content. For example, if a content item 560 was received from the content provider based on center 580 and radius 581 and a duplicate content item 560 was also received based on center 582 and radius 583, the duplicate content item may be removed, disregarded, ignored, indicated as excess content, and/or otherwise may not be added to the geofeed.

Figure 6:
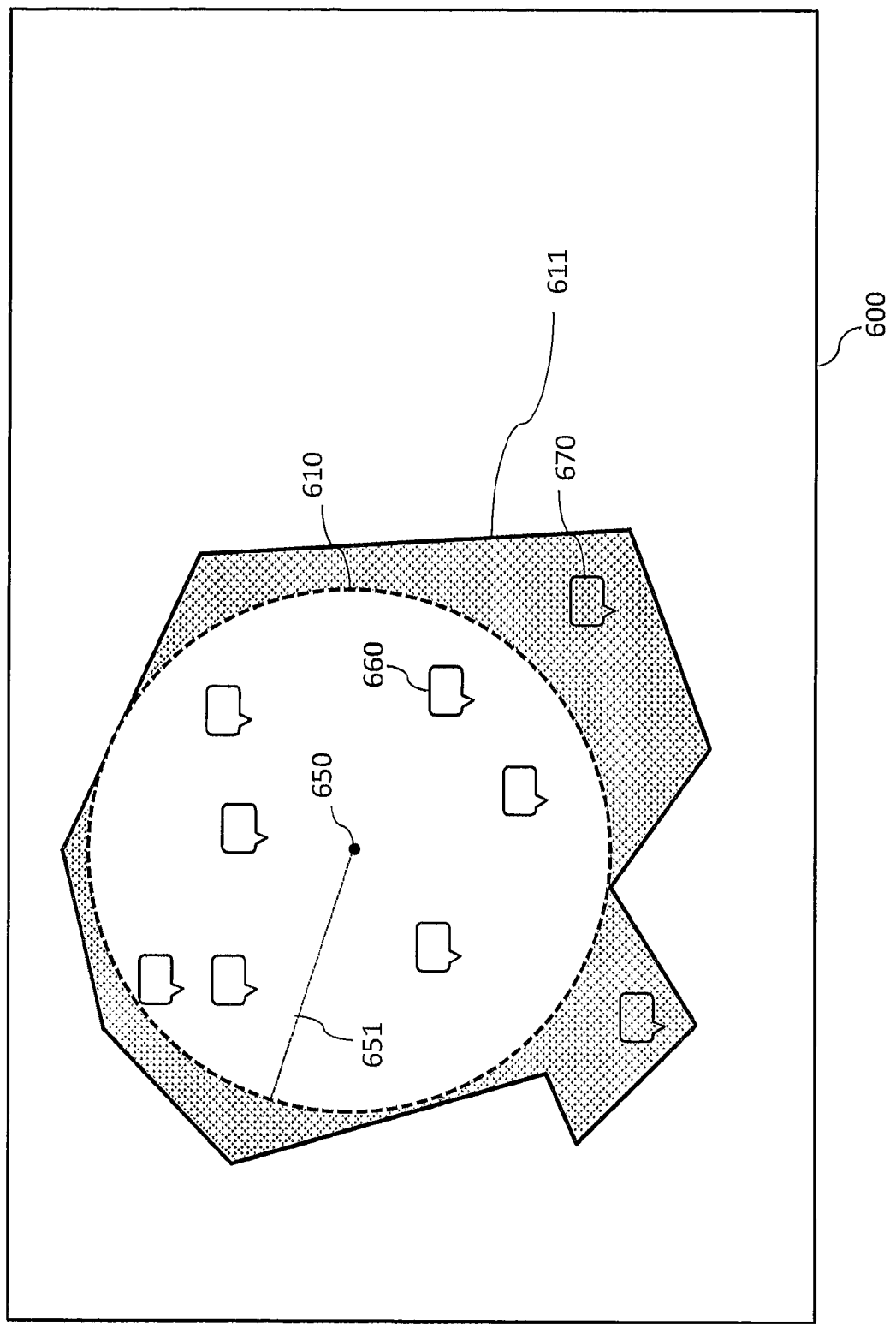
FIG. 6 illustrates a screenshot of an interface for communicating a geofeed generated based on a geo-location input shaped as a polygon, according to an aspect of the invention.

FIG. 6 illustrates a screenshot of an interface 600 for communicating a geofeed generated based on a geo-location input shaped as a polygon, according to an aspect of the invention.

Referring to FIG. 6, interface 600 may provide a geofeed that may be generated based on a geo-location input and a formatted geo-location input that has been created by normalizing the geo-location input. For example, a user may specify locations of interest by drawing a polygon 611 via interface 600. As illustrated, polygon 611 is displayed that indicates a boundary of a geofeed. The geo-location input shaped as polygon 611 may be normalized into an input format that may be acceptable for a particular content provider, such as a point and radius input. During the normalization and/or formatting process, a centroid 650 of polygon 611 and corners may be identified. Based on centroid 650 and a radius (illustrated by a dotted line 651), the formatted geo-location input may be formed and/or used to request content from the content provider.

The content received from the content provider based on centroid 650 and radius 651 may be under-inclusive such that there may be additional content such as a content item 670 that is located just outside of the area specified by a circle 610 but still within the area specified by polygon 611. Such additional content such as content item 670 may be added to the received content including a content item 660, for example.

Figure 7:
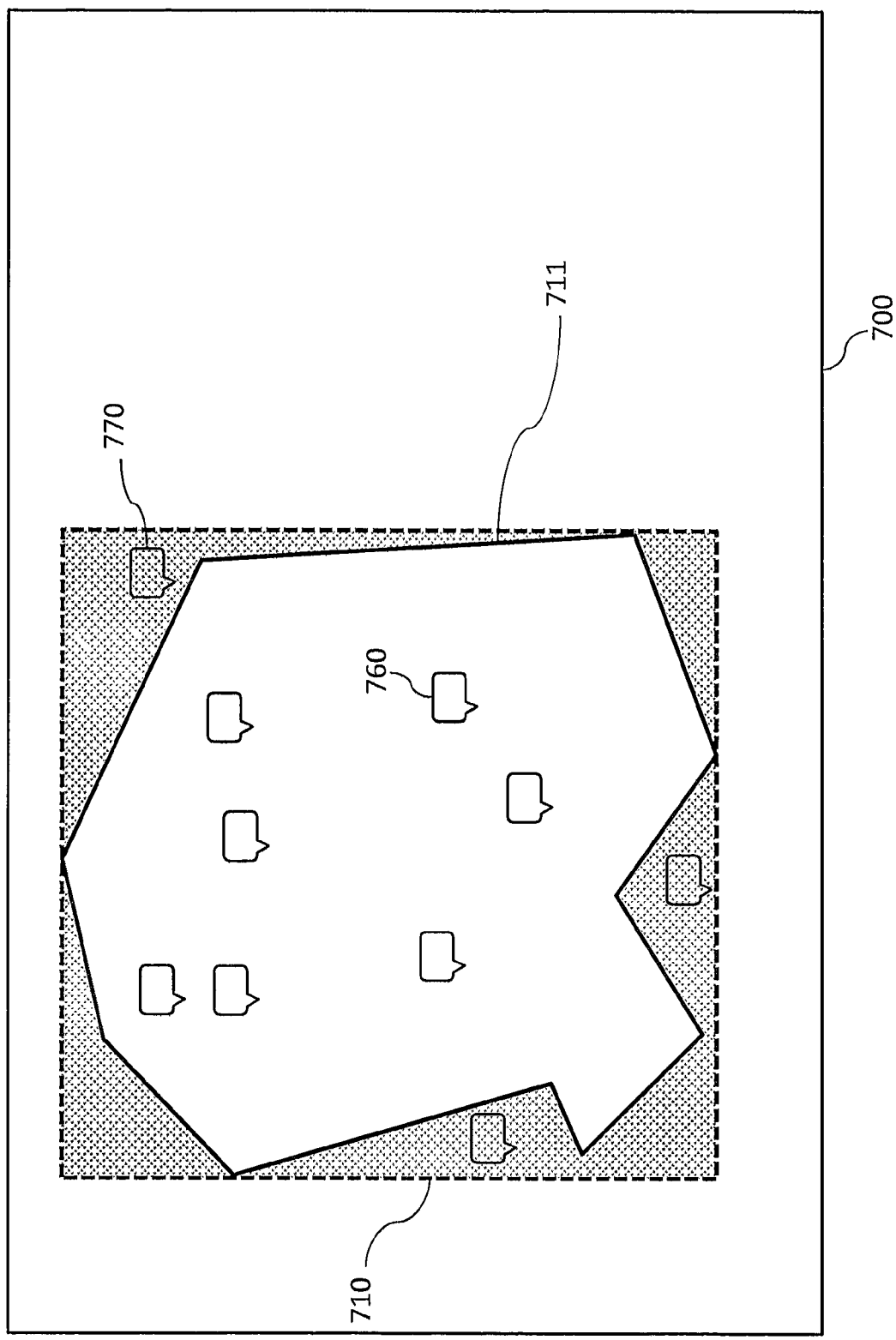
FIG. 7 illustrates a screenshot of an interface for communicating a geofeed generated based on a geo-location input shaped as a polygon, according to an aspect of the invention.

FIG. 7 illustrates a screenshot of an interface 700 for communicating a geofeed generated based on a geo-location input shaped as a polygon, according to an aspect of the invention.

Referring to FIG. 7, interface 700 may provide a geofeed that may be generated based on a geo-location input and a formatted geo-location input that has been created by normalizing the geo-location input. For example, a content consumer may specify locations of interest by drawing a polygon 711 via interface 700. As illustrated, polygon 711 is displayed that indicates a boundary of a geofeed. The geo-location input shaped as polygon 711 may be normalized into an input format that may be acceptable for a particular content provider. The input format that is acceptable, in this example, may be a zip code (and/or neighborhood, city, state, etc. and/or any other non-circular shaped geographical area). During the normalization and/or formatting process, a zip code (as illustrated as a rectangle 710 but it may also be shaped as a circle, polygon, or any other non-circular shapes) to which the area specified by polygon 711 belongs may be identified. Based on the zip code shaped as rectangle 710, the formatted geo-location may be formed and/or used to request content from the content provider.

The content received from the content provider based on the zip code shaped as rectangle 710 may include excess content that is outside of the area represented by polygon 711. Such excess content such as a content item 770 may be located in the shaded area of rectangle 710. Content item 770 may be removed from the received content whereas content such as a content item 760 that is within polygon 711 may be added to the geofeed.

Figure 8:
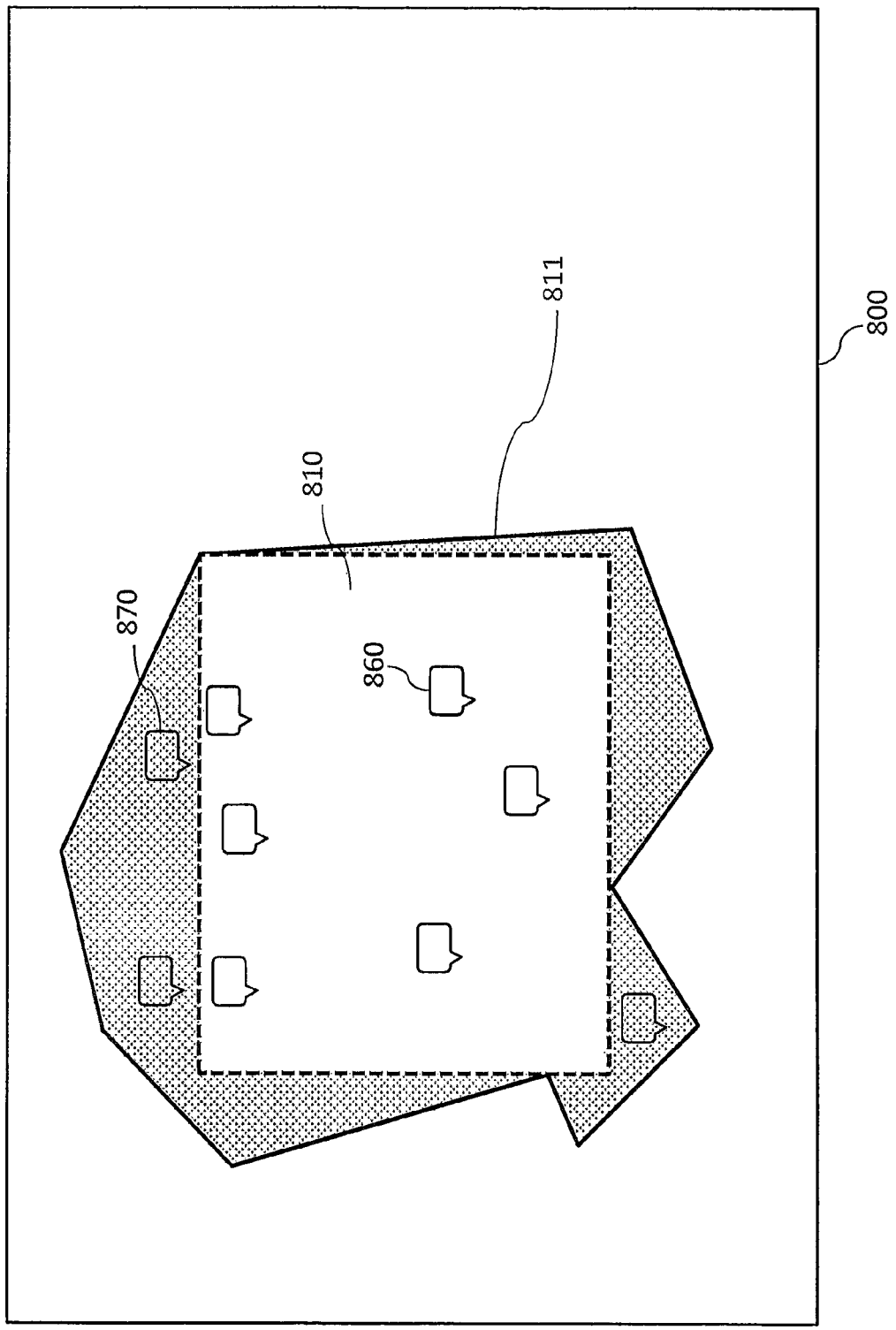
FIG. 8 illustrates a screenshot of an interface for communicating a geofeed generated based on a geo-location input shaped as a polygon, according to an aspect of the invention.

FIG. 8 illustrates a screenshot of an interface 800 for communicating a geofeed generated based on a geo-location input shaped as a polygon, according to an aspect of the invention.

Referring to FIG. 8, interface 800 may provide a geofeed that may be generated based on a geo-location input and a formatted geo-location input that has been created by normalizing the geo-location input. For example, a content consumer may specify locations of interest by drawing a polygon 811 via interface 800. As illustrated, polygon 811 is displayed that indicates a boundary of a geofeed. The geo-location input shaped as polygon 811 may be normalized into an input format that may be acceptable for a particular content provider. The input format that is acceptable, in this example, may be a zip code (and/or neighborhood, city, state, etc. and/or any other non-circular shaped geographical area). During the normalization and/or formatting process, a zip code (as illustrated as a rectangle 810 but it may also be shaped as a circle, polygon, or any other non-circular shapes) of which the area specified by polygon 811 is a part may be identified. Based on the zip code shaped as rectangle 810, the formatted geo-location may be formed and/or used to request content from the content provider.

The content received from the content provider based on the zip code shaped as rectangle 810 may be under-inclusive such that there may be additional content such as a content item 870 that is located just outside of the area specified by rectangle 810 but still within the area specified by polygon 811. Such additional content such as content item 870 may be added to the received content including a content item 860, for example.

Figure 9:
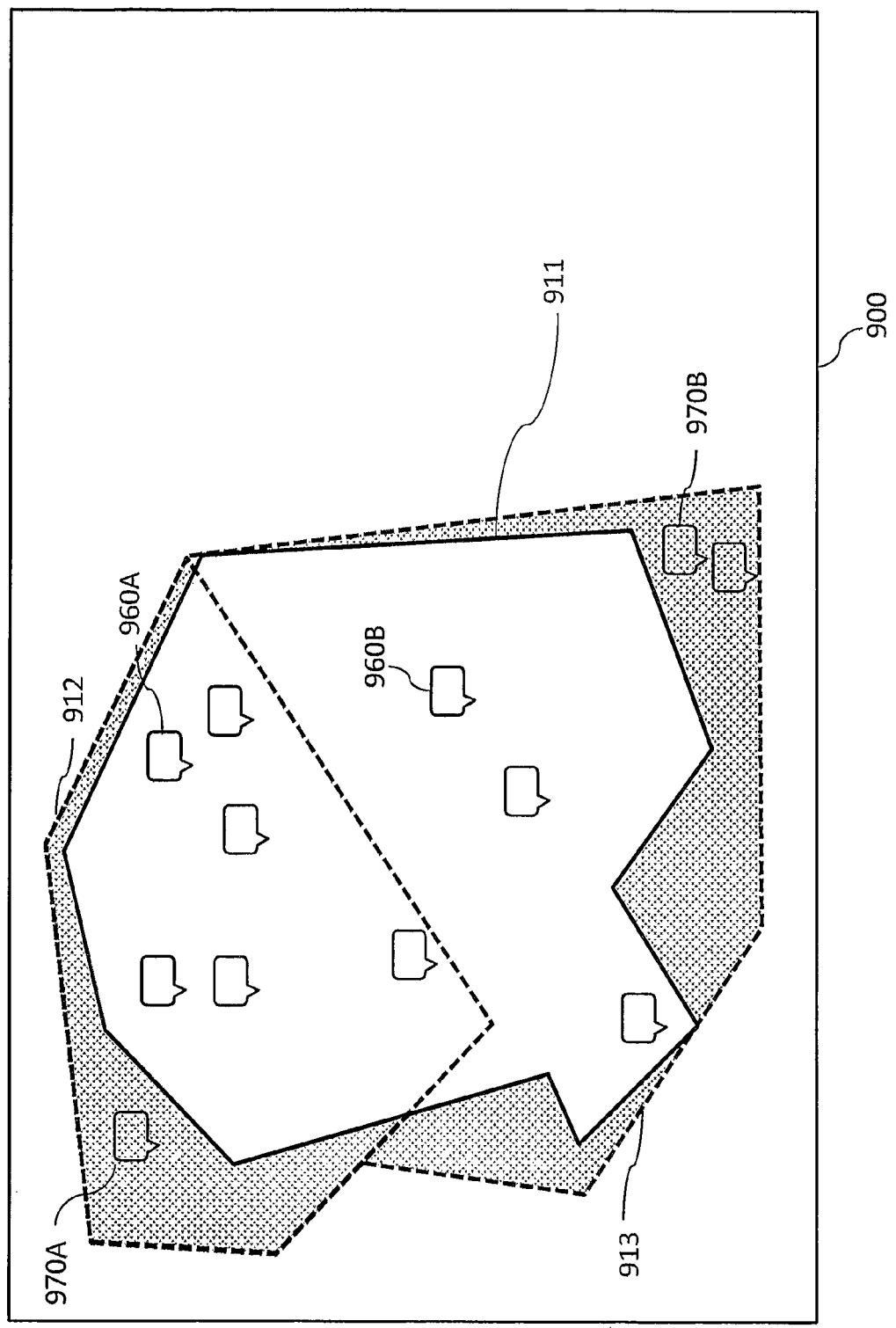
FIG. 9 illustrates a screenshot of an interface for communicating a geofeed generated based on a geo-location input shaped as a polygon, according to an aspect of the invention.

FIG. 9 illustrates a screenshot of an interface 900 for communicating a geofeed generated based on a geo-location input shaped as a polygon, according to an aspect of the invention.

Referring to FIG. 9, interface 900 may provide a geofeed that may be generated based on a geo-location input and a formatted geo-location input that has been created by normalizing the geo-location input. For example, a content consumer may specify locations of interest by drawing a polygon 911 via interface 900. As illustrated, polygon 911 is displayed that indicates a boundary of a geofeed. The geo-location input shaped as polygon 911 may be normalized into an input format that may be acceptable for a particular content provider. The input format that is acceptable, in this example, may be a zip code (and/or neighborhood, city, state, etc. and/or any other non-circular shaped geographical area). If the geographical area bounded by polygon 911 overlaps with more than one zip code (as illustrated by zip codes 912 and 913), the geo-location input shaped as polygon 911 may be normalized into zip codes 912 and 913 which may be used to request content from the content provider.

The content received from the content provider based on zip codes 912 and 913 may include excess content that is outside of the area represented by polygon 911. Such excess content such as content items 970A and 970B may be located in the shaded area of zip codes 912 and 913. Content items 970A and 970B may be removed from the received content whereas content such as content items 960A and 960B that are within polygon 911 may be added to the geofeed.

Figure 10:
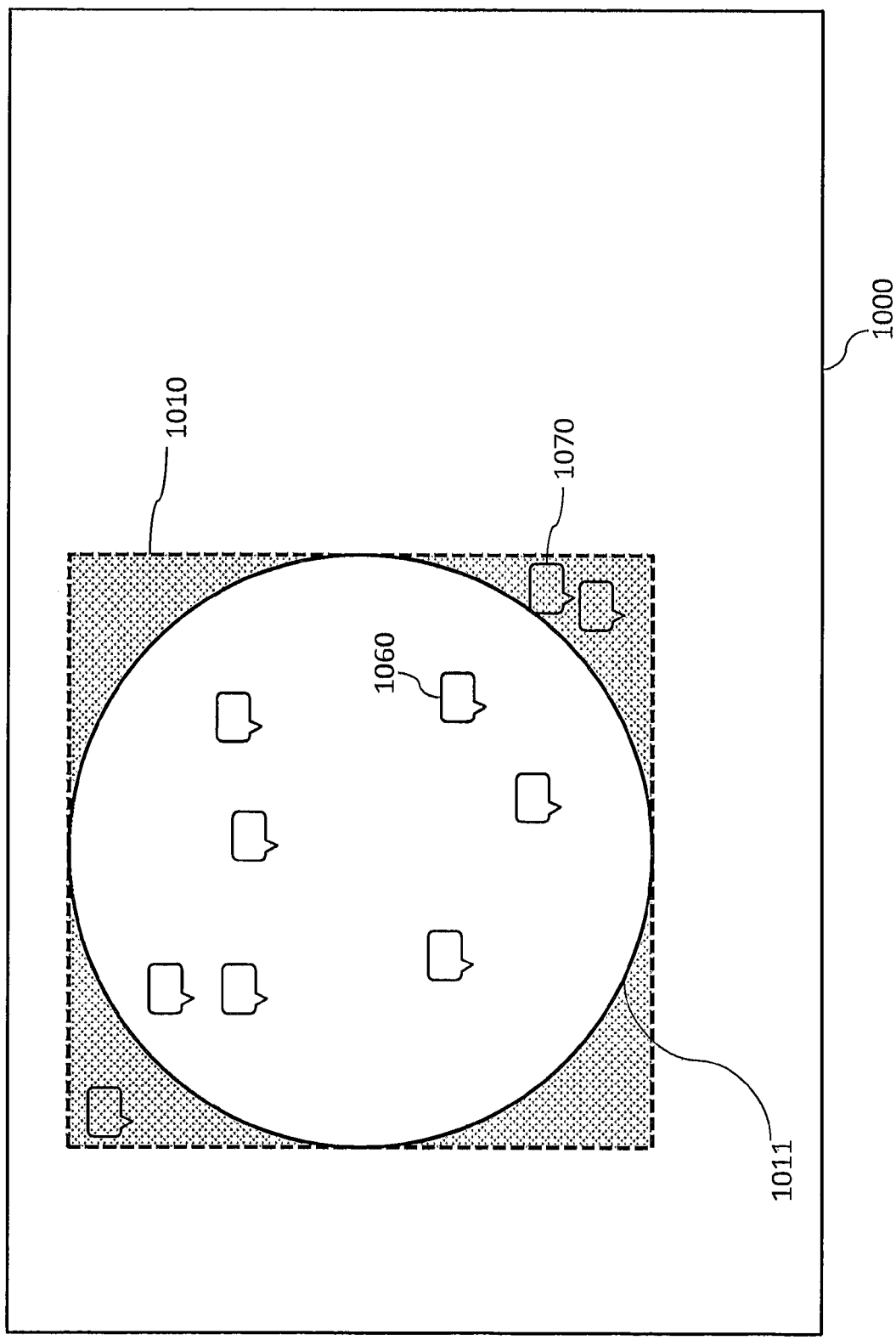
FIG. 10 illustrates a screenshot of an interface for communicating a geofeed generated based on a geolocation input shaped as a circle, according to an aspect of the invention.

FIG. 10 illustrates a screenshot of an interface 1000 for communicating a geofeed generated based on a geo-location input shaped as a circle, according to an aspect of the invention.

Referring to FIG. 10, interface 1000 may provide a geofeed that may be generated based on a geo-location input and a formatted geo-location input that has been created by normalizing the geo-location input. For example, a content consumer may specify locations of interest by drawing a circle 1011 via interface 1000. As illustrated, circle 1011 is displayed that indicates a boundary of a geofeed. The geo-location input shaped as circle 1011 may be normalized into an input format that may be acceptable for a particular content provider. The input format that is acceptable, in this example, may be a zip code (and/or neighborhood, city, state, etc. and/or any other non-circular shaped geographical area). During the normalization and/or formatting process, a zip code (as illustrated as a rectangle 1010 but it may also be shaped as a circle, polygon, or any other non-circular shapes) to which the area specified by circle 1011 belongs may be identified. Based on the zip code shaped as rectangle 1010, the formatted geo-location may be formed and/or used to request content from the content provider.

The content received from the content provider based on the zip code shaped as rectangle 1010 may include excess content that is outside of the area represented by circle 1011. Such excess content such as a content item 1070 may be located in the shaded area of rectangle 1010. Content item 1070 may be removed from the received content whereas content such as a content item 1060 that is within circle 1011 may be added to the geofeed.

Figure 11:
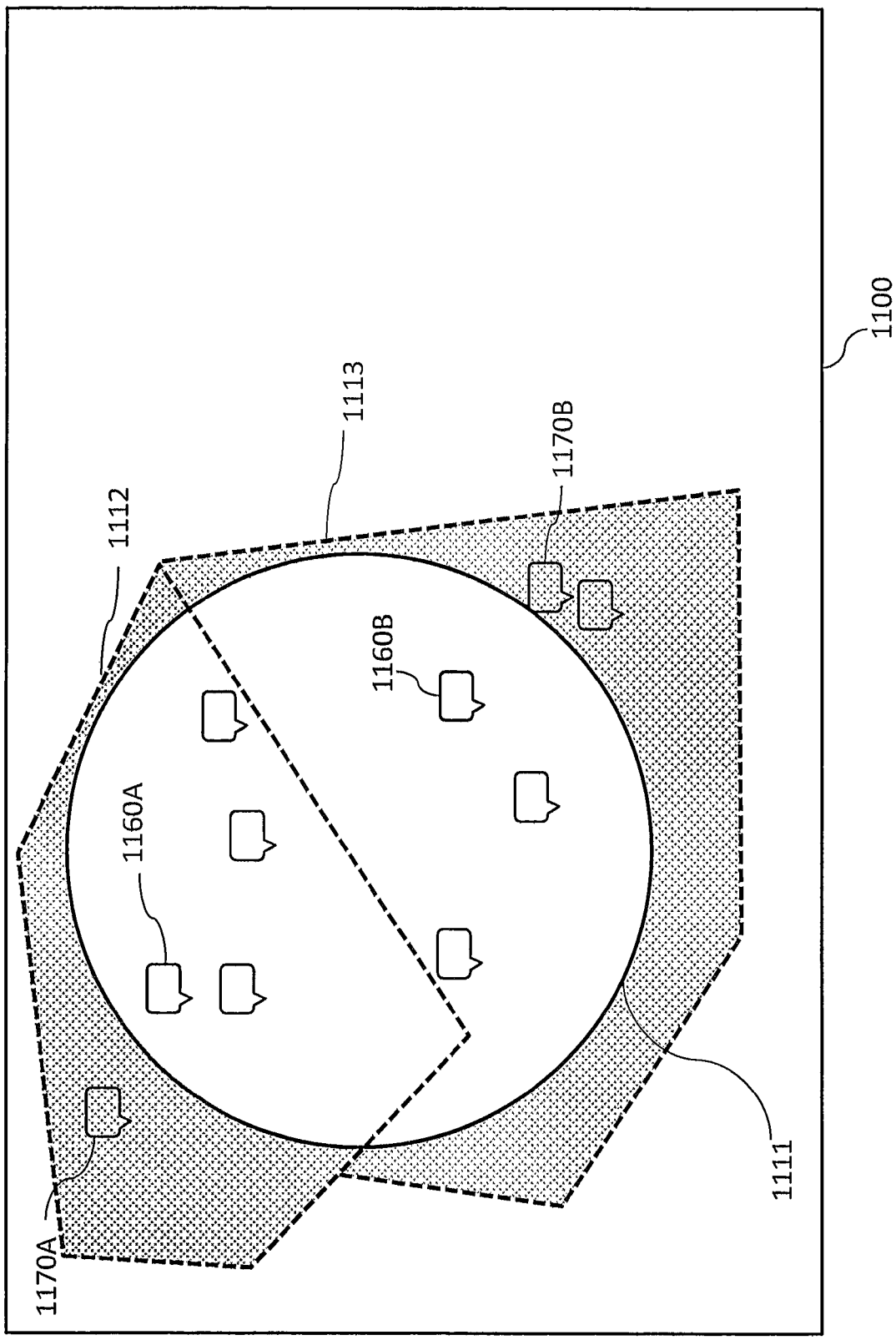
FIG. 11 illustrates a screenshot of an interface for communicating a geofeed generated based on a geo-location input shaped as a circle, according to an aspect of the invention.

FIG. 11 illustrates a screenshot of an interface 1100 for communicating a geofeed generated based on a geo-location input shaped as a circle, according to an aspect of the invention.

Referring to FIG. 11, interface 1100 may provide a geofeed that may be generated based on a geo-location input and a formatted geo-location input that has been created by normalizing the geo-location input. For example, a content consumer may specify locations of interest by drawing a circle 1111 via interface 1100. As illustrated, circle 1111 is displayed that indicates a boundary of a geofeed. The geo-location input shaped as circle 1111 may be normalized into an input format that may be acceptable for a particular content provider. The input format that is acceptable, in this example, may be a zip code (and/or neighborhood, city, state, etc. and/or any other non-circular shaped geographical area). If the geographical area bounded by circle 1111 overlaps with more than one zip code (as illustrated by zip codes 1112 and 1113), the geo-location input shaped as circle 1111 may be normalized into zip codes 1112 and 1113 which may be used to request content from the content provider.

The content received from the content provider based on zip codes 1112 and 1113 may include excess content that is, outside of the area represented by circle 1111. Such excess content such as content items 1170A and 1170B may be located in the shaded area of zip codes 1112 and 1113. Content items 1170A and 1170B may be removed from the received content whereas content such as content items 1160A and 1160B that are within circle 1111 may be added to the geofeed.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for processing geo-location inputs to be used to obtain content from a plurality of social media content providers, the method being implemented in a computer that includes one or more physical processors programmed by one or more computer program instructions, the method comprising:

obtaining, by the computer, a geo-location input comprising a specification of one or more geographically definable locations, wherein the geo-location input is to be used to obtain content from a first social media content provider that uses a first input format for the geo-location input and a second social media content provider that uses a second input format for the geo-location input;

determining, by the computer, a first geographic size threshold indicating one or more allowable geographic dimensions for the first input format;

determining, by the computer, whether the geo-location input exceeds the first geographic size threshold;

responsive to a determination that the geo-location input exceeds the first geographic size threshold, converting, by the computer, the geo-location input into a first plurality of segments such that dimensions of each of the plurality of first segments do not exceed the first geographic size threshold, wherein each of the first plurality of segments specifies a respective first portion of the one or more geographically definable locations;

converting, by the computer, the geo-location input into a second plurality of segments, wherein each of the second plurality of segments specifies a respective second portion of the one or more geographically definable locations;

generating, by the computer, a first plurality of formatted geo-location inputs based on the first plurality of segments, wherein the first plurality of formatted geo-location inputs is compatible with the first input format, wherein at least one of the first plurality of formatted geo-location inputs is generated based on the first geographic size threshold;

generating, by the computer, a second plurality of formatted geo-location inputs based on the second plurality of segments, wherein the second plurality of formatted geo-location inputs is compatible with the second input format;

causing, by the computer, the first plurality of formatted geo-location inputs to be communicated to the first social media content provider and causing the second plurality of formatted geo-location inputs to be communicated to the second social media content provider;

receiving, by the computer, a plurality of content items from the first social media content provider based on the first plurality of formatted geo-location inputs;

determining, by the computer, that at least a first content item from among the plurality of content items is associated with a first location that is outside of the one or more geographically definable locations specified in the geo-location input;

filtering out, by the computer, the first content item from a set of content items that is to be communicated to one or more entities, wherein the set of content items comprises one or more of the plurality of content items;

providing, by the computer, an indication of the filtered out first content item;

receiving, by the computer, an indication to add the filtered out first content item to the set of content items responsive to the provided indication of the filtered out first content item; and causing, by the computer, the filtered out first content item to be added to the set of content items responsive to the received indication to add the filtered out first content item.

2. The method of claim 1, wherein the one or more allowable geographic dimensions comprises an allowable length, an allowable width, or an allowable area.

3. The method of claim 1, wherein the geo-location input comprises a map input shaped as a polygon, the method further comprising:

identifying, by the computer, a centroid and a corner of the polygon;

determining, by the computer, a center of a circle based on the centroid and a radius of the circle based on the corner; and generating, by the computer, at least one of the first plurality of formatted geo-location inputs based on the center and the radius.

4. The method of claim 1, wherein the geo-location input comprises a text input, the method further comprising:

determining, by the computer, one or more geographical coordinates based on the text input;

determining, by the computer, a center of a circle and a radius of the circle based on the one or more geographical coordinates; and generating, by the computer, at least one of the first plurality of formatted geo-location inputs based on the center and the radius.

5. The method of claim 1, the method further comprising:

storing, by the computer, a first content provider profile that specifies the first input format for the first social media content provider, wherein the first input format is obtained from the first content provider profile; and storing, by the computer, a second content provider profile that specifies the second input format for the second social media content provider, wherein the second input format is obtained from the second content provider profile.

6. The method of claim 5, wherein the first content provider profile further specifies an allowable size for the first input format, the method further comprising:

determining, by the computer, a size of individual ones of the first plurality of formatted geo-location inputs based on the allowable size.

7. The method of claim 5, wherein the first content provider profile further specifies an allowable shape for the first input format, the method further comprising:

determining, by the computer, a shape of individual ones of the first plurality of formatted geo-location inputs based on the allowable shape.

8. The method of claim 1, wherein the geo-location input comprises a user-defined input that is drawn on a map interface, and wherein the one or more entities comprise a user from which the user-defined input originated, the method further comprising:

determining, by the computer, a set of geographical coordinates based on the user-defined input; and wherein converting the geo-location input into the first plurality of segments is based on the set of geographical coordinates.

9. The method of claim 1, wherein the geo-location input comprises a map input or a text input.

10. The method of claim 1, the method further comprising:

identifying, by the computer, at least a second content item that was not included among the plurality of content items but should have been included based on the geo-location input and the first plurality of formatted geo-location inputs and adding the second content item to the received plurality of content items;

providing, by the computer, an indication of the second content item;

receiving, by the computer, an indication to remove the second content item; and causing, by the computer, the second content item to be filtered out responsive to the indication to remove the second content item.

11. A system for processing geo-location input to be used to obtain content from a plurality of social media content providers, the system comprising:

a computer comprising one or more physical processors programmed with computer program instructions that cause the computer to:

obtain a geo-location input, the geo-location input comprising one or more geographically definable locations, wherein the geo-location input is to be used to obtain content from a first social media content provider that uses a first input format for the geo-location input and a second social media content provider that uses a second input format for the geo-location input;

determine a first geographic size threshold indicating one or more allowable geographic dimensions for the first input format;

determine whether the geo-location input exceeds the first geographic size threshold;

responsive to a determination that the geo-location input exceeds the first geographic size threshold, convert the geo-location input into a first plurality of segments such that dimensions of each of the plurality of first segments do not exceed the first geographic size threshold, wherein each of the first plurality of segments specifies a respective first portion of the one or more geographically definable locations;

convert the geo-location input into a second plurality of segments, wherein each of the second plurality of segments specifies a respective second portion of the one or more geographically definable locations;

generate a first plurality of formatted geo-location inputs based on the first plurality of segments, wherein the first plurality of formatted geo-location inputs is compatible with the first input format, wherein at least one of the first plurality of formatted geo-location inputs is generated based on the first geographic size threshold;

generate a second plurality of formatted geo-location inputs based on the second plurality of segments, wherein the second plurality of formatted geo-location inputs is compatible with the second input format;

cause the first plurality of formatted geo-location inputs to be communicated to the corresponding first social media content provider and cause the second plurality of formatted geo-location inputs to be communicated to the corresponding second social media content provider;

receive a plurality of content items from the first social media content provider based on the first plurality of formatted geo-location inputs;

determine that at least a first content item from among the plurality of content items is associated with a first location that is outside of the one or more geographically definable locations specified in the geo-location input;

filter out the first content item from a set of content items that is to be communicated to one or more entities, wherein the set of content items comprises one or more of the plurality of content items;

provide an indication of the filtered out first content item;

receive an indication to add the filtered out first content item to the set of content items responsive to the provided indication of the filtered out first content item; and cause the filtered out first content item to be added to the set of content items responsive to the received indication to add the filtered out first content item.

12. The system of claim 11, wherein the one or more allowable geographic dimensions comprises an allowable length, an allowable width, or an allowable area.

13. The system of claim 11, wherein the geo-location input comprises a map input shaped as a polygon, and wherein the computer is further programmed to:
identify a centroid of the polygon and a plurality of corners of the polygon;
determine a corner having the longest distance between the corner and the centroid relative to other corners of the polygon;
determine a center of a circle based on the centroid and a radius of the circle based on the longest distance; and
generate a first formatted geo-location input comprising the center and the radius.

14. The system of claim 11, wherein the geo-location input comprises a text input, the computer further programmed to:
determine one or more geographical coordinates based on the text input; and
determine a center of a circle and a radius of the circle, based on the one or more geographical coordinates, wherein at least one of the first plurality of formatted geo-location inputs is generated based on the center and the radius.

15. The system of claim 11, wherein the one or more processors are further programmed to:
store a first content provider profile that specifies the first input format for the first social media content provider, wherein the first input format is obtained from the first content provider profile; and
store a second content provider profile that specifies the second input format for the second social media content provider, wherein the second input format is obtained from the second content provider profile.

16. The system of claim 15, wherein the first content provider profile further specifies an allowable size for the first input format, and wherein the computer is further programmed to:
determine a size of individual ones of the first plurality of formatted geo-location inputs based on the allowable size.

17. The system of claim 15, wherein the first content provider profile further specifies an allowable shape for the first input format, the method further comprising:
determine a shape of individual ones of the first plurality of formatted geo-location inputs based on the allowable shape.

18. The system of claim 11, wherein the geo-location input comprises a user-defined input that is specified by a user on a map, and wherein the one or more entities comprise the user.

19. The system of claim 18, wherein the computer is further programmed to:
determine a set of geographical coordinates based on the user-defined input; and
determine a center and a radius of a circle based on the set of geographical coordinates, wherein at least one of the first plurality of formatted geo-location inputs is generated based on the center and the radius.

20. The system of claim 11, wherein the geo-location input comprises a map input or a text input.

21. The system of claim 11, wherein the computer is further programmed to:
identify at least a second content item that was not included among the plurality of content items but should have been included based on the geo-location input and the plurality of first geo-location inputs, and add the second content item to the received plurality of content items;

provide an indication of the second content item;
receive an indication to remove the second content item; and
cause the second content item to be filtered out responsive to the indication to remove the second content item.

* * * * *